(12) United States Patent
Abdelsalam et al.

(10) Patent No.: US 10,008,716 B2
(45) Date of Patent: Jun. 26, 2018

(54) DEVICE AND METHOD OF FORMING A DEVICE

(71) Applicant: Nexeon Limited, Oxfordshire (GB)

(72) Inventors: Mamdouh Abdelsalam, Oxfordshire (GB); Fazil Coowar, Oxfordshire (GB); William Macklin, Oxfordshire (GB)

(73) Assignee: Nexeon Limited, Abingdon, Oxfordshire (GB)

( * ) Notice: Subject to any disclaimer, the term of this patent is extended or adjusted under 35 U.S.C. 154(b) by 380 days.

(21) Appl. No.: 14/436,186

(22) PCT Filed: Oct. 31, 2013

(86) PCT No.: PCT/GB2013/052846
§ 371 (c)(1),
(2) Date: Apr. 16, 2015

(87) PCT Pub. No.: WO2014/068318
PCT Pub. Date: May 8, 2014

(65) Prior Publication Data
US 2015/0280221 A1    Oct. 1, 2015

(30) Foreign Application Priority Data
Nov. 2, 2012  (GB) .................................. 1219729.9

(51) Int. Cl.
*H01M 4/36* (2006.01)
*H01M 4/133* (2010.01)
(Continued)

(52) U.S. Cl.
CPC ......... *H01M 4/366* (2013.01); *H01M 4/0402* (2013.01); *H01M 4/0404* (2013.01);
(Continued)

(58) Field of Classification Search
None
See application file for complete search history.

(56) References Cited

U.S. PATENT DOCUMENTS 4,002,541 A   1/1977   Streander
4,192,720 A   3/1980   Bucker et al.
(Continued)

FOREIGN PATENT DOCUMENTS

CN      1569623 A    1/2005
CN      1967910 A    5/2007
(Continued)

OTHER PUBLICATIONS

Gao et al., Alloy formation in Nanostructured Silicon, Journal of Advanced Materials, 13(11):816-819 (2001).
(Continued)

*Primary Examiner* — Scott J Chmielecki
(74) *Attorney, Agent, or Firm* — Choate, Hall & Stewart LLP; William R. Haulbrook

(57) ABSTRACT

A multilayer electrode suitable for use in a secondary battery is disclosed. The major active component of one layer is different to a major active component of an adjacent layer. The use of layered electrodes improves both the capacity retention and cycle life of batteries including such layered electrodes.

18 Claims, 11 Drawing Sheets

(51) Int. Cl.
*H01M 4/134* (2010.01)
*H01M 4/1393* (2010.01)
*H01M 4/1395* (2010.01)
*H01M 4/38* (2006.01)
*H01M 4/587* (2010.01)
*H01M 4/62* (2006.01)
*H01M 4/04* (2006.01)
*H01M 4/583* (2010.01)
*H01M 4/64* (2006.01)
*H01M 10/0525* (2010.01)

(52) U.S. Cl.
CPC ....... *H01M 4/0409* (2013.01); *H01M 4/0416* (2013.01); *H01M 4/0419* (2013.01); *H01M 4/0428* (2013.01); *H01M 4/0435* (2013.01); *H01M 4/133* (2013.01); *H01M 4/134* (2013.01); *H01M 4/1393* (2013.01); *H01M 4/1395* (2013.01); *H01M 4/386* (2013.01); *H01M 4/583* (2013.01); *H01M 4/587* (2013.01); *H01M 4/622* (2013.01); *H01M 4/623* (2013.01); *H01M 4/625* (2013.01); *H01M 4/64* (2013.01); *H01M 10/0525* (2013.01); *H01M 2220/20* (2013.01); *H01M 2220/30* (2013.01)

(56) References Cited

U.S. PATENT DOCUMENTS

| | | |
|---|---|---|
| 4,363,708 A | 12/1982 | Rauchle et al. |
| 4,686,013 A | 8/1987 | Pensabene et al. |
| 5,395,711 A | 3/1995 | Tahara et al. |
| 5,658,691 A | 8/1997 | Suzuki et al. |
| 5,914,183 A | 6/1999 | Canham |
| 6,132,724 A | 10/2000 | Blum |
| 6,190,951 B1 | 2/2001 | Nakahori et al. |
| 6,334,939 B1 | 1/2002 | Zhou et al. |
| 6,514,395 B2 | 2/2003 | Zhou et al. |
| 7,138,208 B2 | 11/2006 | Tanjo et al. |
| 7,244,513 B2 | 7/2007 | Li et al. |
| 7,311,999 B2 | 12/2007 | Kawase et al. |
| 7,332,339 B2 | 2/2008 | Canham |
| 7,402,829 B2 | 7/2008 | Green |
| 7,479,351 B2 | 1/2009 | Matsubara et al. |
| 7,615,206 B2 | 11/2009 | Sandhage et al. |
| 7,638,239 B2 | 12/2009 | Sato et al. |
| 7,713,849 B2 | 5/2010 | Habib et al. |
| 7,824,801 B2 | 11/2010 | Kogetsu et al. |
| 7,851,086 B2 | 12/2010 | Matsubara et al. |
| 7,879,734 B2 | 2/2011 | Fukutani et al. |
| 8,080,337 B2 | 12/2011 | Higuchi et al. |
| 8,526,166 B2 | 9/2013 | Choi et al. |
| 8,585,918 B2 | 11/2013 | Green et al. |
| 8,597,831 B2 | 12/2013 | Green et al. |
| 8,772,174 B2 | 7/2014 | Green et al. |
| 8,940,192 B2 | 1/2015 | Toyokawa |
| 8,940,437 B2 | 1/2015 | Green et al. |
| 8,945,431 B2 | 2/2015 | Schulz et al. |
| 9,252,426 B2 | 2/2016 | Green |
| 9,548,489 B2 | 1/2017 | Abdelsalam et al. |
| 2001/0044045 A1 | 11/2001 | Sato et al. |
| 2002/0037433 A1 | 3/2002 | Rasmussen et al. |
| 2002/0074972 A1 | 6/2002 | Narang et al. |
| 2002/0121460 A1 | 9/2002 | Moy et al. |
| 2002/0148727 A1 | 10/2002 | Zhou et al. |
| 2002/0164479 A1 | 11/2002 | Matsubara et al. |
| 2003/0099883 A1 | 5/2003 | Ochoa et al. |
| 2003/0150378 A1 | 8/2003 | Winterton et al. |
| 2004/0052867 A1 | 3/2004 | Canham |
| 2004/0140222 A1 | 7/2004 | Smedley et al. |
| 2004/0166319 A1 | 8/2004 | Li et al. |
| 2004/0214085 A1 | 10/2004 | Sheem et al. |
| 2005/0186378 A1 | 8/2005 | Bhatt |
| 2005/0186474 A1 | 8/2005 | Jiang et al. |
| 2006/0019151 A1 | 1/2006 | Imachi et al. |
| 2006/0099495 A1 | 5/2006 | Suzuki et al. |
| 2006/0147802 A1 | 7/2006 | Yasuda et al. |
| 2006/0166098 A1 | 7/2006 | Tabuchi et al. |
| 2006/0216603 A1 | 9/2006 | Choi |
| 2006/0251561 A1 | 11/2006 | Farrell et al. |
| 2007/0011102 A1 | 1/2007 | Matsuhira et al. |
| 2007/0020521 A1 | 1/2007 | Obrovac et al. |
| 2007/0031733 A1 | 2/2007 | Kogetsu et al. |
| 2007/0054190 A1 | 3/2007 | Fukui et al. |
| 2007/0077490 A1 | 4/2007 | Kim et al. |
| 2007/0099081 A1 | 5/2007 | Matsuda et al. |
| 2007/0111101 A1 | 5/2007 | Ohkubo et al. |
| 2007/0111102 A1 | 5/2007 | Inoue et al. |
| 2007/0224508 A1 | 9/2007 | Aramata et al. |
| 2007/0255198 A1 | 11/2007 | Leong et al. |
| 2007/0281216 A1 | 12/2007 | Petrat et al. |
| 2008/0038170 A1 | 2/2008 | Sandhage et al. |
| 2008/0062616 A1 | 3/2008 | Matsuda et al. |
| 2008/0096110 A1 | 4/2008 | Bito et al. |
| 2008/0113269 A1 | 5/2008 | Yamamoto et al. |
| 2008/0124631 A1 | 5/2008 | Fukui et al. |
| 2008/0145757 A1 | 6/2008 | Mah et al. |
| 2008/0166474 A1 | 7/2008 | Deguchi et al. |
| 2008/0261112 A1 | 10/2008 | Nagata et al. |
| 2008/0280207 A1 | 11/2008 | Patoux et al. |
| 2009/0004566 A1 | 1/2009 | Shirane et al. |
| 2009/0004568 A1 | 1/2009 | Hirose et al. |
| 2009/0010833 A1 | 1/2009 | Rosenband et al. |
| 2009/0137688 A1 | 5/2009 | Yang |
| 2009/0143227 A1 | 6/2009 | Dubrow et al. |
| 2009/0169985 A1 | 7/2009 | Yamaguchi et al. |
| 2009/0186267 A1 | 7/2009 | Tiegs |
| 2009/0253033 A1 | 10/2009 | Hirose et al. |
| 2009/0301866 A1 | 12/2009 | Zaghib et al. |
| 2010/0008841 A1 | 1/2010 | Rosenkilde |
| 2010/0112442 A1 | 5/2010 | Fujikawa et al. |
| 2010/0112451 A1 | 5/2010 | Shibutani et al. |
| 2010/0112475 A1 | 5/2010 | Natsume et al. |
| 2010/0143773 A1 | 6/2010 | Honbou |
| 2010/0143798 A1 | 6/2010 | Zhamu et al. |
| 2010/0178565 A1 | 7/2010 | Green |
| 2010/0190061 A1 | 7/2010 | Green |
| 2010/0196760 A1 | 8/2010 | Green |
| 2010/0243951 A1 | 9/2010 | Watanabe et al. |
| 2010/0266902 A1 | 10/2010 | Takano et al. |
| 2010/0278931 A1 | 11/2010 | Ashton et al. |
| 2010/0285358 A1 | 11/2010 | Cui et al. |
| 2010/0291441 A1 | 11/2010 | Ugaji et al. |
| 2010/0297502 A1 | 11/2010 | Zhu et al. |
| 2010/0330418 A1 | 12/2010 | Liang et al. |
| 2010/0330425 A1 | 12/2010 | Lopatin et al. |
| 2011/0008531 A1 | 1/2011 | Mikhaylik et al. |
| 2011/0027537 A1 | 2/2011 | Inoue et al. |
| 2011/0039690 A1 | 2/2011 | Niu |
| 2011/0056563 A1 | 3/2011 | Bari |
| 2011/0067228 A1 | 3/2011 | Green |
| 2011/0076560 A1 | 3/2011 | Scordilis-Kelley et al. |
| 2011/0085960 A1 | 4/2011 | Mukasyan et al. |
| 2011/0104480 A1 | 5/2011 | Malekos et al. |
| 2011/0111135 A1 | 5/2011 | Kamiyama et al. |
| 2011/0111279 A1 | 5/2011 | Smithyman et al. |
| 2011/0123866 A1* | 5/2011 | Pan ................... H01M 2/16 429/221 |
| 2011/0163274 A1 | 7/2011 | Plee et al. |
| 2011/0236493 A1 | 9/2011 | Canham et al. |
| 2011/0244328 A1 | 10/2011 | Iriyama et al. |
| 2011/0250498 A1 | 10/2011 | Green et al. |
| 2011/0269019 A1 | 11/2011 | Green et al. |
| 2011/0281180 A1 | 11/2011 | Kim et al. |
| 2011/0287318 A1 | 11/2011 | Loveness et al. |
| 2011/0299223 A1* | 12/2011 | Oh ................... H01G 11/04 361/502 |
| 2012/0040242 A1 | 2/2012 | Kurasawa et al. |
| 2012/0094178 A1 | 4/2012 | Loveridge et al. |
| 2012/0100438 A1 | 4/2012 | Fasching et al. |
| 2012/0107688 A1 | 5/2012 | Loveridge |
| 2012/0121999 A1 | 5/2012 | Laurencin et al. |
| 2012/0171566 A1 | 7/2012 | Yoshitake et al. |

(56) References Cited

U.S. PATENT DOCUMENTS

| | | | |
|---|---|---|---|
| 2012/0255858 A1* | 10/2012 | Maeshima | H01M 4/587 204/294 |
| 2012/0315543 A1 | 12/2012 | Wata et al. | |
| 2013/0196158 A1 | 8/2013 | Yoshida et al. | |
| 2013/0216907 A1 | 8/2013 | Rayner et al. | |
| 2013/0224583 A1 | 8/2013 | Green | |
| 2014/0147751 A1 | 5/2014 | Yang et al. | |
| 2014/0162131 A1 | 6/2014 | Friend et al. | |
| 2014/0170303 A1 | 6/2014 | Rayner et al. | |
| 2014/0193711 A1 | 7/2014 | Biswal et al. | |
| 2014/0235884 A1 | 8/2014 | Veinot et al. | |
| 2014/0349183 A1 | 11/2014 | MacKlin et al. | |
| 2015/0044571 A1 | 2/2015 | Abdelsalam et al. | |
| 2015/0104705 A1 | 4/2015 | Canham et al. | |
| 2016/0172670 A1 | 6/2016 | Friend | |
| 2016/0197342 A1 | 7/2016 | Lee et al. | |
| 2016/0308205 A1 | 10/2016 | Canham et al. | |
| 2017/0133674 A1 | 5/2017 | Murphy et al. | |
| 2017/0200939 A1 | 7/2017 | Murphy et al. | |
| 2017/0346079 A1 | 11/2017 | Friend et al. | |

FOREIGN PATENT DOCUMENTS

| | | |
|---|---|---|
| CN | 101188281 A | 5/2008 |
| CN | 101335342 A | 12/2008 |
| CN | 101442124 A | 5/2009 |
| CN | 101471457 A | 7/2009 |
| CN | 101591478 A | 12/2009 |
| CN | 102157731 A | 8/2011 |
| CN | 103 165 870 A | 6/2013 |
| CN | 103 633 295 A | 3/2014 |
| CN | 103840140 A | 6/2014 |
| EP | 1335438 A1 | 8/2003 |
| EP | 1427039 A2 | 6/2004 |
| EP | 1750314 A1 | 2/2007 |
| EP | 1791199 A1 | 5/2007 |
| EP | 2037516 A1 | 3/2009 |
| EP | 2051317 A1 | 4/2009 |
| EP | 2383224 A1 | 11/2011 |
| EP | 2509142 A1 | 10/2012 |
| EP | 2873646 A1 | 5/2015 |
| EP | 2533331 B1 | 8/2015 |
| GB | 980513 A | 1/1965 |
| GB | 2395059 A | 5/2004 |
| GB | 2464158 A | 4/2010 |
| GB | 2470056 A | 11/2010 |
| GB | 2483372 A | 3/2012 |
| GB | 2495951 A | 5/2013 |
| JP | 06-325765 A | 11/1994 |
| JP | 11-250896 | 9/1999 |
| JP | 2001-266866 A | 9/2001 |
| JP | 2003-303586 A | 10/2003 |
| JP | 2004-185984 A | 7/2004 |
| JP | 2004/214054 A | 7/2004 |
| JP | 2004281317 A | 10/2004 |
| JP | 2005-63955 A | 3/2005 |
| JP | 03714665 B2 | 11/2005 |
| JP | 2006-100244 A | 4/2006 |
| JP | 2006172860 A | 6/2006 |
| JP | 2006-269216 A | 10/2006 |
| JP | 2007-294423 A | 11/2007 |
| JP | 2007318057 A | 12/2007 |
| JP | 2007335198 A | 12/2007 |
| JP | 2008-166013 A | 7/2008 |
| JP | 2008186732 A | 8/2008 |
| JP | 2008-293872 A | 12/2008 |
| JP | 2008305746 A | 12/2008 |
| JP | 2010205609 A | 9/2010 |
| JP | 2011-192629 A | 9/2011 |
| JP | 2011/198614 A | 10/2011 |
| JP | 2012084521 A | 4/2012 |
| JP | 2012084522 A | 4/2012 |
| KR | 2008-0091883 A | 10/2008 |
| KR | 2013 0107892 A | 10/2013 |
| KR | 20140070227 A | 6/2014 |
| SU | 471402 A1 | 3/1973 |
| SU | 471402 A1 | 5/1975 |
| SU | 544019 A | 7/1975 |
| SU | 544019 A1 | 1/1977 |
| WO | WO-97/01193 A1 | 1/1997 |
| WO | WO-2005/075048 A1 | 8/2005 |
| WO | WO-2005/096414 A2 | 10/2005 |
| WO | WO-2006/068066 A1 | 6/2006 |
| WO | WO-2006/097380 A1 | 9/2006 |
| WO | WO-2006/135375 A2 | 12/2006 |
| WO | WO-2007/037787 A1 | 4/2007 |
| WO | WO-2007/083152 A1 | 7/2007 |
| WO | WO-2007/083155 A1 | 7/2007 |
| WO | WO-2007/094641 A1 | 8/2007 |
| WO | WO-2008/044683 A1 | 4/2008 |
| WO | WO-2009/010758 A2 | 1/2009 |
| WO | WO-2009/010759 A1 | 1/2009 |
| WO | WO-2009/033082 A2 | 3/2009 |
| WO | WO-2009/050585 A1 | 4/2009 |
| WO | WO-2009/063801 A1 | 5/2009 |
| WO | WO-2009/089018 A2 | 7/2009 |
| WO | WO-2009/128800 A1 | 10/2009 |
| WO | WO-2010/026332 A1 | 3/2010 |
| WO | WO-2010/040985 A1 | 4/2010 |
| WO | WO-2010/128310 A1 | 11/2010 |
| WO | WO-2010/130975 A1 | 11/2010 |
| WO | WO-2010/130976 A1 | 11/2010 |
| WO | WO-2010/139987 A2 | 12/2010 |
| WO | WO-2011/042742 A1 | 4/2011 |
| WO | WO-2011/117436 A1 | 9/2011 |
| WO | WO-2012/028857 A1 | 3/2012 |
| WO | WO-2012/028858 A1 | 3/2012 |
| WO | WO-2012/084570 A1 | 6/2012 |
| WO | WO-2012/093224 A1 | 7/2012 |
| WO | WO-2012/175998 A1 | 12/2012 |
| WO | WO-2013/021630 A1 | 2/2013 |
| WO | WO-2013/024305 A2 | 2/2013 |
| WO | WO-2013/114094 A1 | 8/2013 |
| WO | WO-2013/128201 A2 | 9/2013 |
| WO | WO-2013/140177 A2 | 9/2013 |
| WO | WO-2013/146658 A1 | 10/2013 |
| WO | WO-2013/179068 A2 | 12/2013 |
| WO | WO-2013/179068 A3 | 1/2014 |
| WO | WO-2014/068318 A1 | 5/2014 |
| WO | WO-2015/041450 A1 | 3/2015 |
| WO | WO-2015/082920 A1 | 6/2015 |

OTHER PUBLICATIONS

International Search Report, PCT/GB2014/053594, 6 pages, dated May 22, 2015.
Notice of Opposition, EP 2533331 B1, 6 pages, dated May 27, 2016.
Ohara, S. et al., A thin film silicon anode for Li-ion batteries having a very large specific capacity and long cycle life, Journal of Power Sources, (136):303-306 (2004).
U.S. Appl. No. 14/128,365, Friend, filed Feb. 10, 2014.
U.S. Appl. No. 14/236,309, Rayner, filed Jan. 30, 2014.
U.S. Appl. No. 14/371,814, Abdelsalam, filed Jul. 11, 2014.
U.S. Appl. No. 14/371,837, Abdelsalam, filed Jul. 11, 2014.
U.S. Appl. No. 14/371,822, Macklin, filed Jul. 11, 2014.
U.S. Appl. No. 14/403,478, Canham, filed Nov. 24, 2014.
U.S. Appl. No. 14/907,425, Friend, filed Jan. 25, 2016.
U.S. Appl. No. 15/101,209, Canham, filed Jun. 2, 2016.
Cui, et al. Doping and Electrical Transport in Silicon Nanowires, Journal of Physical Chemistry, 104(22):5213-5216 (2000).
Cullis et al., Structural and Luminescence properties of porous silicon, Applied Physics Reviews, 82(3):909-965 (1997).
Gao, B, Synthesis and Electrochemical Properties of Carbon Nanotubes and Silicon Nanowires, Ph.D. Thesis in Applied and Material Sciences, University of North Carolina Chapel Hill (2001).
GB Patent Application No. 0601319.7, filed Jan. 23, 2006, 14 pages.
Jung, K. H. et al., Developments in Luminescent Porous Si, J. Electrochem. Soc., 140(10):3046-3064 (1993).
Kuriyama, K. et al., Anomalous electrical resistivity and photovoltaic phenomenon in the fast mixed conductor lithium silicide $Li_{12}Si_{7}$, Physical Review, 38(18):1436-38 (1988).

(56) References Cited

OTHER PUBLICATIONS

Li, H. et al., The crystal structural evolution of nano-Si anode caused by lithium insertion and extraction at room temperature, Solid State Ionics 135:181-191 (2000).
Meijer, J.A. et al., Electrical resistivity and 7Li Knight shift of liquid Li-Si alloys, J. Phys. Condens. Matter I, 5283-5289 (1989).
Merriam Webster, Definition of Particle, 1 page.
Morales, Alfredo M. and Lieber, Charles M., A Laser Ablation Method for the Synthesis of Crystalline Semiconductor Nanowires, Science, 279(9):208-211 (1998).
Shih, S. et al., Transmission electron microscopy study of chemically etched porous Si, Applied Physical Letters, 62(5):467-69 (1993).
Sinha, S. et al., Synthesis of Silicon Nanowires and Novel Nano-Dendrite Structures, CP544 Electronic Properties of Novel Materials Molecular Nanostructures, 431-436 (2000).
Sinha, S. et al., Synthesis of silicon nanowires and novel nano-dendrite structures, Journal of Nanoparticle Research 6: 421-425 (2004).
Tarascon, J M. et al., An update of the Li metal-free rechargeable battery based on $Li_{1+x}Mn_2O_4$ cathodes and carbon anodes, Journal of Power Sources, 43-44:689-700 (1993).
Van Schalkwijk, Walter A. and Scrosati, Bruno, Advances in Lithium-Ion Batteries (edited 2002 Excerpts).
Wakihara, M., Recent development in lithium ion batteries, Materials Science and Engineering, R33:109-134 (2001).
Winter, Martin and Brodd, Ralph J., Batteries versus Fuel Cells versus Electrochemical Capacitors, Chem. Rev. 104:4245-4269 (2004).
Zhang, Sheng Shui, A review on electrolyte additives for lithium-ion batteries, Journal of Power Sources, 162:1379-1394 (2006).
Zhou, G. W. et al., Controlled Li doping of Si nanowires by electrochemical insertion methods, Applied Physics Letters, 75(16):2447-2449 (1999).
Huang et al., Metal-Assisted Etching of Silicon: A Review, Adv. Mater. 23:285-308 (2011).
International Search and Examination Report, GB1219729.9, 9 pages, dated Mar. 20, 2013.
Winter et al., Insertion Electrode Materials for Rechargeable Lithium Batteries, Adv. Mater. 10(10):725-7963 (1988).
Bang, B.M. et al., Scalable Approach to Multi-Dimensional Bulk Si Anodes via Metal-Assisted Chemical Etching, Energy & Environmental Science, 4:5013-5019 (2011).
Chartier, C. et al., Metal-assisted chemical etching of silicon in HF-H2O2, Electrochimica Acta, 53(17):5509-5516 (2008).
Chen et al., Mesoporous Silicon Anodes Prepared by Magnesiothermic Reduction for Lithium Ion Batteries, Journal of the Electrochemical Society, 158(9):A1055-A1059 (2011).
Chen, X. et al., A Patterned 3D Silicon Anode Fabricated by Electrodeposition on a Virus-Structured Current Collector, Advanced Function Materials, 21:380-387 (2011).
Choi et al., Silica nanofibres from electrospinning/sol-gel process, J. Mater. Sci. Letters, 22:891-893 (2003).
Graetz, J. et al., Highly reversible lithium storage in nanostructured silicon, Journal of the Electrochemical Society, 6(9):194-197 (2003).
Hatchard, T. D. and Dahn, J. R., In Situ XRD and Electrochemical Study of the Reaction of Lithium with Amorphous Silicon, Journal of the Electrochemical Society, 151(6):A838-A842 (2004).
Jia et al., Novel Three-Dimensional Mesoporous Silicon for High Power Litium-Ion Battery Anode Material, Advs. Energy Mater., 1:1036-1039 (2011).

Krissanasaeranee et al., Preparation of Ultra-Fine Silica Fibers Using Electrospun Ply(Vinyl Alcohol)/Silatrane Composite Fibers as Precursor, J. Am. Ceram. Soc., 91(9):2830-2835 (2008).
Lestriez, B. et al., Hierarchical and Resilient Conduction Network of Bridged Carbon Nanotubes and Nanofibers for High-Energy Si Negative Electrodes, Electrochemical and Solid-State Letters, 12(4):76-80 (2009).
Ma et al., Silver nanoparticles decorated, flexible $Si_2$ nanofibers with long-term antibacterial effect as reusable wound cover, Colloids and Surfaces A: Physicochem. Eng. Aspects 387:57-64 (2011).
Mallet, J. et al., Growth of silicon nanowires of controlled diameters by electrodeposition in ionic liquid at room temperature, Nanoletters, 8(10):3468-3474 (2008).
Oudenhoven, Jos F. M. et al., All-solid-State Lithium-Ion Microbatteries: A Review of Various Three-Dimensional Concepts, Adv. Energy Mater. 1:10-33 (2011).
Purkid et al., Synthesis and Characterization of $SiO_2$ Nanowires Prepared from Rice Husk Ash, J. Metals, Materials and Minerals, 19(2):33-37 (2009).
Richman et al., Ordered Mesoporous Silicon through Magensium Reduction of Polymer Templated Silica Thin Films, Nano Lett., 8(9):3075-3079 (2008).
Robinson, D. and Walsh, F.C., The Performance of a 500 Amp Rotating Cylinder Electrode Reactor. Part 1: Current-Potential Data and Single Pass Studies, Hydrometallurgy, 26:93 (1991).
Rongguan, L. et al., Electrodeposited porous-microspheres Li-Si films as negative electrodes in lithium-ion batteries, Journal of Power Sources, 196(8):3868-3873 (2011).
Schmuck, M. et al, Alloying of electrodeposited silicon with lithium—a principal study of applicability as a node material for lithium ion batteries, J. Solid State Electrochem, 14:2203-2207 (2010).
Shin, H. C. et al., Nanoporous Structures Prepared by an Electrochemical Deposition Process, Advanced Materials, 15:19, 1610-1614 (2003).
Teschke, O. et al., Test cell simulating the operating conditions of water electrolysers for the evaluation of gas evolving electrocatalysts, Journal of Applied Electrochemistry, 13(3):371-376 (1983).
Wachtler, M. et al., Anodic materials for rechargeable Li-batteries, Journal of Power Sources 105:151-160 (2002).
Xiao, et al., Stabilization of Silicon Anode for Li-ion Batteries, Journal of the Electrochemical Society, 157(10):1047-1051 (2010).
Yang, J. et al., Si/c composites for high capacity lithium storage materials, Journal of the Electrochemical Society, 6(8):154-156 (2003).
Yu et al., Reversible Storage of Lithium in Silver-Coated Three-Dimensional Macroporous Silicon, Adv. Mater., 22:2247-2250 (2010).
Zhang et al., Vapor-induced solid-liquid-solid process for silicon-based nanowire growth, Journal of Power Sources 195:1691-1697 (2010).
Webb, P.A. and Orr, C., Modern Methods of Particle Characterization, Micromeritics, 17 pages (1998).
International Search Report, PCT/GB2013/052846, 3 pages, dated Mar. 11, 2014.
Ren, W. et al., Preparation of porous silicon/carbon microspheres as high performance anode materials for lithium ion batteries, Journal of Materials Chemistry A: Materials for Energy and Sustainability, 3(11):5859-5865 (2015).
Search Report, GB0818645.4, 2 pages (dated Jan. 25, 2010).

* cited by examiner

DEVICE AND METHOD OF FORMING A DEVICE

CROSS-REFERENCE TO RELATED APPLICATION

This patent application is a National Stage Entry of International Patent Application No. PCT/GB2013/052846, filed on Oct. 31, 2013; this patent application claims priority to GB 1219729.9, filed on Nov. 2, 2012, the entire contents of both of which are hereby incorporated by reference herein.

The present invention relates generally to compositions comprising particles of an electroactive material and additives, and use of said compositions in devices including fuel cells and rechargeable metal ion batteries.

BACKGROUND

Rechargeable metal-ion batteries, for example lithium ion batteries, are extensively used in portable electronic devices such as mobile telephones and laptops, and are finding increasing application in electric or hybrid electric vehicles.

With reference to FIG. 1, known rechargeable metal ion batteries 100 have a conductive layer 101 such as a layer of metal; an anode layer 103; a cathode layer 107 capable of releasing and re-inserting metal ions; an electrolyte 105 between the anode and cathode layers 103 and 107; and a conductive layer 109 such as a layer of metal. When the battery cell is fully charged, metal ions have been transported from the metal-ion-containing cathode 107 layer via the electrolyte 105 into the anode layer 103.

The anode layer 103 may contain particles of an electroactive material and a binder material ("active material" or "electroactive material" as used anywhere herein means a material which is able to insert into its structure, and release therefrom, metal ions such as lithium, sodium, potassium, calcium or magnesium during the respective charging phase and discharging phase of a battery. Preferably the material is able to insert and release lithium.)

In the case of a graphite-based anode layer of a lithium ion battery, lithium insertion results in formation of the compound $Li_xC_6$ ($0<=x<=1$). Graphite has a maximum capacity of 372 mAh/g.

The use of a silicon-based active anode material is also known in the art. Silicon has a substantially higher maximum capacity than graphite. However, unlike active graphite which remains substantially unchanged during insertion and release of metal ions, the process of insertion of metal ions into silicon results in substantial structural changes, accompanied by substantial expansion. For example, insertion of lithium ions into silicon results in formation of a Si—Li alloy. The effect of Li ion insertion on the anode material is described in, for example, "Insertion Electrode Materials for Rechargeable Lithium Batteries", Winter et al, Adv. Mater. 1988, 10, No. 10, pages 725-763.

US 2009/301866 discloses a multilayer of a solid support, a first solid layer adhering to the solid support and a second solid layer adhering to the first solid layer, wherein each of the first and second solid layers contain particles of an electrochemically active material and a binder. Both the first and second layer comprise an elastomeric binder.

US 2012/040242 discloses an anode of a lithium ion secondary battery, the anode having a multilayer structure composed of a first layer containing silicon and a second layer containing silicon and a metal element. The presence of the metal element is stated to inhibit expansion and shrinkage of the anode.

U.S. Pat. No. 7,311,999 discloses an anode of an anode collector, an anode active material layer and a layer of silicon oxide on the anode active material layer. The layer of silicon oxide is included to inhibit reaction between the anode active material layer and an electrolyte.

U.S. Pat. No. 7,638,239 discloses an electrode of a current collector containing copper, an active material and a buffer formed from two layers between the current collector and the active material. The buffer is provided to prevent excessive diffusion of copper from the current collector into the active material, and diffusion of silicon from the active material into the current collector.

U.S. Pat. No. 7,824,801 discloses an electrode of a current collector, a first silicon layer having no oxygen or a low ratio of oxygen to silicon and a second silicon layer having a higher oxygen to silicon ratio. The first layer is stated to have a high charge/discharge capacity and high electron conductivity, but a large expansion coefficient and low ion conductivity. The second layer is stated to have a smaller coefficient of expansion and lower charge/discharge capacity than the first layer, but higher ion conductivity.

U.S. Pat. No. 8,080,337 discloses a current collector and alternating first and second layers. The first layer contains an active material. The second layer has a larger Young's modulus than the first layer and is conductive. The second layer may be a conductive metal compound, for example a metal nitride, a metal carbide or a metal boride.

Preferably the invention provides energy generating devices, including but not limited to metal ion batteries, having improved performance.

General

According to a first aspect of the invention, there is provided a multilayer electrode comprising, in sequence, a conductive layer, a first composite electrode layer and second composite electrode layer, each composite electrode layer comprising a particulate material suitable for use as the active material in a metal ion battery and a binder, wherein a major component of the active material of the first composite electrode layer (first major active component) is a material that is different from a material forming a major component of the active material of the second composite electrode layer (second major active component).

Optionally the multi-layer electrode comprises an interface between the first composite layer and the second composite layer.

Optionally, the binders of the first and second composite electrode layers are different.

Optionally, the binder of the first composite electrode layer is an elastomeric polymer and the binder of the second composite electrode layer is a non-elastomeric polymer.

Optionally, the theoretical specific capacity of the major active component of the second composite electrode layer is higher than that of the major active component of the first composite electrode layer.

Optionally one or each-layer comprises one or more sub-layers.

Optionally the first composite electrode layer comprises one or more lower sub-layers adjacent to or in the region of the current collector. Optionally the first composite electrode layer comprises one or more upper sub-layers at or in the region of the interface between the first composite electrode layer and the second composite electrode layer.

Optionally the second composite layer comprises a lower surface adjacent the interface and an upper surface distal the interface.

Optionally the second composite layer comprises one or more lower sub-layers adjacent to or in the region of the interface between the first composite electrode layer and the second composite electrode layer. Optionally the second composite layer comprises one or more upper sub-layers at or in the region of an upper surface of the second composite electrode layer.

Optionally the concentration of the major active component of one sub-layer differs from the concentration of a major active component in an adjacent sub-layer within a composite layer of the multi-layer electrode.

Optionally the concentration of the first major active component decreases between the current collector and the interface with the second composite electrode layer.

Optionally the concentration of the second active component increases in a direction between the interface with the first composite electrode layer and an upper surface of the second composite electrode layer.

Optionally the composition of the binder in one sub-layer differs from the composition of the binder in an adjacent sub-layer within a layer of the multi-layer electrode. Optionally the binder comprises a co-polymer of an elastomeric and a non-elastomeric polymer. Optionally the binder comprises a co-polymer comprising an elastomeric and a non-elastomeric polymer in a ratio 90:10 to 10:90.

Optionally the porosity of the first composite electrode layer is different to the porosity of the second composite electrode layer.

Optionally the porosity of the first composite electrode layer is less than the porosity of the second composite electrode layer.

Optionally the porosity of the first composite electrode layer is greater than 5 vol %.

Optionally the porosity of the first composite electrode layer is less than 30 vol %.

Optionally the porosity of the first composite electrode layer is in the range 20 to 25 vol %.

Optionally the porosity of the second composite electrode layer is greater than 20 Vol %.

Optionally the porosity of the second composite electrode layer is less than 80 Vol %.

Optionally the porosity of the second composite layer is in the range 30 to 70 vol %.

Optionally the porosity of one sub-layer differs from the porosity of an adjacent sub-layer within a layer of the multi-layer electrode.

Optionally the porosity of an upper sub-layer of the second composite electrode layer is less than the porosity of a lower sub-layer.

Optionally the first composite electrode layer comprises a first major active component comprising particles of the same or similar morphologies. Optionally the first composite electrode layer comprises a first major active component comprising particles of different morphologies.

Optionally the second composite electrode layer comprises a second major active component comprising particles of the same or similar morphologies.

Optionally the second composite electrode layer comprises a second major active component comprising particles of different morphologies.

Optionally the major active component of the first composite layer comprises an electroactive carbon. Optionally the electroactive carbon is natural and/or artificial graphite or hard carbon.

Optionally, the major active component of the second composite electrode layer is selected from the group consisting of silicon, tin, aluminium, lead and antimony.

Optionally, the theoretical specific capacity of the major active component of the second composite electrode layer is greater than 500 mAh/g and the theoretical specific capacity of the major active component of the first composite electrode layer is less than 400 mAh/g.

Optionally the theoretical specific capacity of one sub-layer differs from the theoretical specific capacity of an adjacent layer within a layer of the multi-layer electrode.

Optionally the theoretical specific capacity of an upper sub-layer of a second composite electrode layer is greater than the theoretical specific capacity of a lower sub-layer.

Optionally, the concentration of the major active component in the first composite anode layer is higher than the concentration of the major active component in the second composite anode layer.

Optionally, the volume increase $V_1$ of the major active component of the second composite electrode layer is at least 90%.

Optionally, the second composite electrode layer contains no more than 20 grams per square meter of the major active component of that layer.

Optionally, the volume increase $V_1$ of the major active component of the first composite anode layer is no more than 30%.

Optionally, the second composite electrode layer contains at least 30 grams per square meter of the major active component of that layer.

Optionally, doped or undoped silicon is the major active component of the second composite electrode layer and active carbon is the major active component of the first composite electrode layer.

Optionally, the active carbon is selected from one or more of hard carbon, carbon nano-tubes and graphite.

Optionally the graphite comprises natural or synthetic graphite. Optionally the graphite is provided in the form of flakes, meso-carbon micro-beads and massive artificial graphite. Small, medium and large carbon flakes may optionally be utilized.

Optionally the graphite comprises meso-carbon micro-beads.

Optionally the active carbon comprises elongate such as carbon nano-tubes and carbon fibres.

Optionally the active carbon comprises hard carbon. Optionally, active carbon is the only major active component of the first composite electrode layer Optionally, doped or undoped silicon is the only active component of the second composite electrode layer.

Optionally the active silicon comprises flakes, particles, fibres, ribbons, scaffold structures, tubes and a mixture thereof. Optionally, the active silicon particles comprise native particles, pillared particles, porous particles, porous particle fragments and mixtures thereof.

Optionally, the particles are spheroidal, cuboidal, elongate or spherical in shape. Optionally, the second composite electrode layer comprises at least one further active material.

Optionally the further active material is an active carbon material.

Optionally, the binder of the first composite electrode layer is PVDF. Optionally the binder for the first composite layer is a polyimide.

Optionally, the binder of the second composite electrode layer is PAA or a salt thereof.

Optionally the binder for second composite electrode layer is carboxymethylcellulose (CMC) or a salt thereof, styrene butadiene rubber (SBR) or a binary or tertiary mixture thereof.

Optionally the binder of the first composite layer comprises a mixture or a copolymer of PVDF and PAA, wherein the PVDF and the PAA are present in a range of 90:10 to 55:45.

Optionally the binder of the second composite layer comprises a mixture or a copolymer of PVDF and PAA, wherein the PVDF and PAA are present in a range of 10:90 to 45:55.

Optionally the binder of either the first composite layer or the second composite layer comprises a mixture of PVDF and PAA. Optionally the binder of the first composite layer comprises PVDF and PAA, wherein the PVDF and PAA are present in a ratio of 90:10 to 55:45. Optionally the binder of the second composite layer comprises PVDF and PAA, wherein the PVDF and PAA are present in a ratio of 10:90 to 55:45.

Optionally the binder of either the first composite layer or the second composite layer comprises a mixture of polyimide (PI) and carboxymethylcellulose (CMC) or styrene butadiene rubber (SBR). Optionally the binder of the first composite layer comprises Polyimide and CMC/SBR, wherein the PI and CMC/SBR are present in a ratio of 90:10 to 55:45. Optionally the binder of the second composite layer comprises PI and CMC/SBR, wherein the PI and CMC/SBR are present in a ratio of 10:90 to 55:45.

Optionally, the first composite electrode layer is formed on the conductive layer.

Optionally, the second composite electrode layer is formed on the first composite electrode layer.

Optionally, an adhesion layer is provided between the first and second electrodes.

Optionally the adhesion layer comprises a mixture of an elastomeric and a non-elastomeric polymer.

Optionally an adhesion layer further comprises a conductive carbon. Optionally the conductive carbon comprises carbon fibres, carbon nano-tubes, ketjen black, lamp black, acetylene black, pitch black, graphene and mixtures thereof.

Optionally, one or more of the composite electrode layers further comprises a conductive particulate additive. Optionally the conductive particulate comprises carbon fibres, carbon nano-tubes, ketjen black, lamp black, acetylene black, graphene and pitch black.

In a second aspect of the invention, there is provided a metal ion battery comprising an anode according to the first aspect of the invention.

In a third aspect of the invention there is provided a method of forming a multilayer electrode according to the first aspect of the invention comprising the steps of: forming the first composite electrode layer over the conductive layer; and forming the second composite electrode layer over the first composite electrode layer.

Optionally, the first and second composite electrode layers of the third aspect may each be formed by depositing a slurry comprising the components of the composite electrode layer and one or more solvents, and evaporating the one or more solvents.

Optionally an adhesion layer is deposited between the first composite layer and the second composite layer. Optionally the adhesion layer comprises carbon fibres, polymeric fibres, metal fibres or a mixture thereof.

Optionally the first and second composite electrode layers are deposited using one or more methods selected from doctor blade coating, electrostatic coating techniques including powder coating, spin coating, spray coating, vertical coating, dip coating and chemical vapour deposition.

Optionally, in the third aspect of the invention, pressure may be applied to at least the first composite electrode layer during or after evaporation of the one or more solvents.

Optionally, in the third aspect of the invention, pressure may be applied by calendering.

Optionally, in the third aspect of the invention, a first pressure may be applied to the first composite electrode layer prior to formation of the second composite electrode layer, and no pressure or a second pressure may be applied to the second composite electrode layer wherein the second pressure is lower than the first pressure.

Optionally, in the third aspect of the invention, the binder of the first composite electrode layer is insoluble in the solvent or solvent mixture of the slurry used to form the second composite electrode layer.

BRIEF DESCRIPTION OF THE DRAWINGS

The invention will now be described in more detail with reference to the drawings in which.

DETAILED DESCRIPTION

Figure 1:
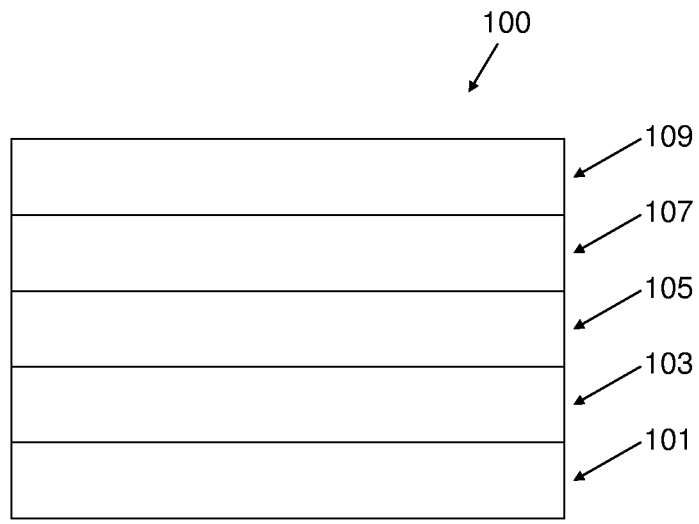
FIG. 1 illustrates a prior art metal ion battery.
Figure 2A:
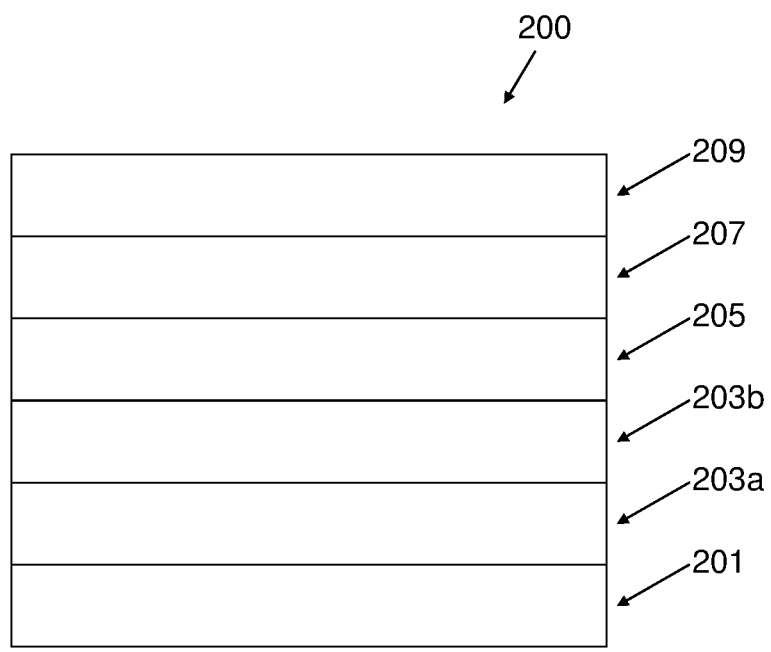
FIG. 2a illustrates a metal ion battery according to an embodiment of the invention having two anode layers.

FIG. 2a illustrates a rechargeable metal ion battery 200 according to an embodiment of the invention. The battery 200 has a conductive anode current collector layer 201 such as a layer of metal; a first composite anode layer 203a; a second composite anode layer 203b; a cathode layer 207 capable of releasing and re-inserting metal ions; an electrolyte 205 between the anode layers 203a and 203b and cathode layer 207; and a conductive layer 209 such as a layer of metal.

Each of composite anode layers 203a and 203b contains at least a binder and particles of one or more electroactive materials. Anode layers 203a and 203b have different compositions. The anode layers 203a and 203b may differ in one or more of the ratio of materials forming each composite layer, or in one or more of the materials forming each composite layer. Each of composite anode layers 203a and 203b may consist essentially of a binder and one or more electroactive materials, or may contain one or more further components, for example particles of one or more non-active conductive material, for example carbon black.

The major active components of the first and second composite anode layers 203a and 203b are different (a material present in a layer as a "major active component" as used herein means that the material forms more than 50 weight % and up to up to 100 weight % of the active material(s) in that layer, optionally 51-100 weight %, 60-100 weight %, 75-100 weight % or 90-100 weight % of the active materials in that layer). Herein, the materials present in the first and second composite layers may be considered to be "different" if their either or both of their intrinsic capacity or volume increase on metal insertion differ.

The same active material may be present in both composite anode layers 203a and 203b, provided that the material is present as a major active component in one anode layer and present only as a minor active component in the other anode layer, or provided that the same active material is provided as a minor active component in both layers. A minor active component may make up 0.5-20 weight % of the active materials of a layer. A minor active component may make up 0.5-10 weight % of the total weight of an anode layer.

The major active component may make up 50-98 weight %, optionally 50-90 weight %, of the total weight of a composite anode layer, the remaining weight being made up of the binder and any other components such as one or more minor active components and non-active conductive additives.

Figure 2B:
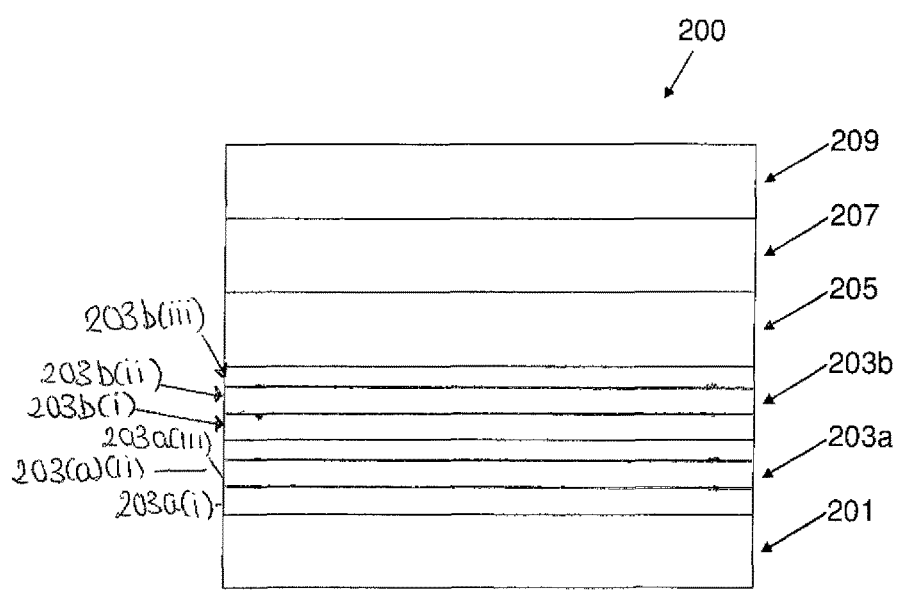
FIG. 2b illustrates a metal ion battery according to an embodiment having two anode layers in which each layer comprises at least two sub-layers.

FIG. 2b illustrates that each of layers 203a and 203b may comprise sub-layers 203a(i), 203a(ii), 203a(iii) . . . , 203a(n), 203b(i), 203b(ii), 203b(iii), . . . 203b(n). The major active components of each sub-layer within a layer are identical. The concentration the major active component in a sub-layer may be identical or different to the concentration of the major active component in an adjacent sub-layer. However, the concentration of the major active component in a sub-layer may different to that of an adjacent sub-layer, providing the average concentration of the major active component over all the sub-layers corresponds to the concentration of the major active component in the layer as a whole. The theoretical intrinsic capacity of each sub-layer may be different to that of an adjacent sub-layer.

Exemplary active materials include graphite, hard carbon, silicon, tin, germanium, gallium, lead, aluminum, bismuth and zinc. In a preferred embodiment, the first and second active materials may be selected from graphite-containing and silicon-containing active materials. The first and second active materials may independently consist essentially of graphite or silicon, including undoped or p- or n-doped graphite or silicon. The first and second active materials may each independently be a composite material.

Active graphite may provide for a larger number of charge/discharge cycles without significant loss of capacity than active silicon, whereas silicon may provide for a higher capacity than graphite. Accordingly, an electrode composition comprising a silicon-containing active material and a graphite active material may provide a lithium ion battery with the advantages of both high capacity and a large number of charge/discharge cycles.

In a preferred embodiment, a major active component of one of the first and second composite anode layers is a silicon-containing active material (including a material that consists essentially of doped or undoped silicon, and a composite active material containing doped or undoped silicon and one or more further materials), and a major active component of the active material of the other of the first and second composite anode layers is graphite.

Preferably the first composite layer comprises graphite as a major active component and the second composite layer comprises silicon as a major active component.

The binders provide cohesion for particles of the composite anode electrodes and as such may serve to prevent migration of particles out of the composite anode electrode layers and/or reduce delamination of the composite anode electrode layers as compared to composite anode electrode layers having no binder. The present inventors have found that an active material may have different compatibilities with different binders. By the term "compatible" it should be understood to mean that a cell prepared from a composite material comprising a binder and one of the major active components disclosed herein does not exhibit more than a 10% loss in discharge capacity over 50 charging/discharging cycles.

The present inventors have found that separating active materials into multiple composite anode layers can be used to enhance device performance. A battery cell comprising a multi-layer composite electrode in which each layer comprises a different major active component to that of an adjacent layer exhibits enhanced charge discharge capacity characteristics compared to a battery comprising a single composite layer comprising a mixture of major active components, because a binder that can efficiently bind one of the major active components is unable to efficiently bind the other major active component. The nature of the binder can be tailored to the composition of a layer of which it forms a part. For example, where a layer or sub-layer comprises a mixture of a first major electroactive component having a compatibility with a first binder and an incompatibility with a second binder and a second electroactive component, which is compatible with a second binder but incompatible with a first binder, the binder for the layer may be a co-polymer or a mixture of the first and second binders; the relative proportions of the first and second binder components in the mixture or co-polymer will depend, in part, on the relative proportions in which the first major and second electroactive components are present within the layer or sub-layer. Since the major component of a layer comprises more than 50 wt % of the layer of which it forms a part, the binder composition will generally comprise a mixture or a copolymer comprising more than 50 wt % of the binder that is compatible with the major electroactive component.

Where a mixture of polymers is used to prepare a composite electrode layer comprising a first major electroactive component and a second electroactive component, the binder suitably comprises 50 to 100 wt % of a binder that is compatible with the first major active component, preferably 60 to 90 wt % and especially 70 to 80 wt %.

Where a mixture of polymers is used to prepare a composite electrode layer comprising a second major electroactive component and a first electroactive component, the binder suitably comprises 50 to 100 wt % of a binder that is compatible with the second major active component, preferably 60 to 90 wt % and especially 70 to 80 wt %.

In a preferred arrangement, the major active component of the first composite anode layer 203a undergoes a smaller volume increase upon metal insertion than the major active component of the second composite anode layer.

Volume changes are given in Table 1 for a range of active materials. The volume percentage values in Table 1 relate to the increase in volume ($V_1$) of the active material upon lithium insertion to the theoretical specific capacity of the active material, the total volume following volume increase being $V_0+V_1$ wherein $V_0$ is the volume of the active material before any lithium insertion. The volume increase $V_1$ is measured by comparing the unit volume of the electrode material before and after charging.

TABLE 1

| | Material | | | | | | |
|---|---|---|---|---|---|---|---|
| | C | Si | Sn | Sb | Al | Mg | Bi |
| Theoretical specific capacity (mAh/g) | 372 | 4200 | 994 | 660 | 993 | 3350 | 385 |
| Volume change $V_1$ (%) | 12 | 320 | 260 | 200 | 96 | 100 | 215 |

Optionally, the volume increase $V_1$ of the major active component of the second composite anode layer is at least 90% (i.e. volume increases to at least 190% of original volume $V_0$), and is optionally up to 300%.

Optionally, the volume increase $V_1$ of the major active component of the first composite anode layer no more than 30%, optionally in the range 5-30%.

It will therefore be appreciated that the extent of expansion and the detrimental effects associated with expansion can be reduced through the formation of multi-layered electrodes according to the invention. An electrode comprising a first or lower layer having a volume increase that does not exceed 30% and a second upper layer having a volume increase of at least 90% does not tend to delaminate or exhibit a phenomenon known as heave during the charging and discharging phases of a battery cell including the electrode (heave should be understood to mean a process by which the electrode mass as a whole moves away from the substrate as a result of the charging and discharging process). The smaller volume increase of the lower layer compared to the upper layer, means that the pressure exerted on the upper layer is less than it would be if the lower layer comprised a material having a larger volume increase on charging or a mixture of a material having a larger volume increase and a material having a smaller volume increase; the pressure build up within an electrode layer leads to de-lamination because the build up of stress within the electrode as a result of the expansion causes the material to crack.

The build up of stress within electrode layers can be further reduced by forming each composite layer from two or more sub-layers. Preferably each sub-layer has a different composition to that of its adjacent sub-layer. Preferably each sub-layer comprises more than 50 wt % of the major active component for that layer. Preferably the concentration of the major active component in each sub-layer either increases or decreases relative to that of an adjacent sub-layer in a direction normal to the current collector.

A first composite layer may comprise more than 50 wt % of a first major electroactive component, which exhibits a volume increase of no more than 30% and up to 40 wt % of a second electroactive component which exhibits a volume increase of at least 90%. Preferably, the first major electroactive component comprises more than 60 wt % of the first composite layer, preferably more than 70 wt %, especially more than 75 wt %. Preferably, the second electroactive component comprises no more than 30 wt %, preferably no more than 20 wt %. Suitably the second electroactive component comprises at least 1 wt %, preferably at least 2 wt % and especially at least 10 wt % of the first composite layer. The first composite layer may comprise sub-layers. The concentration of the first major electroactive component in each sub-layer suitably decreases on passing from sub-layer to sub-layer in a direction perpendicular to the current collector. The concentration of the second electroactive component may remain the same or may increase in passing from sub-layer to sub-layer. This arrangement of layers means that, on charging a battery cell including an electrode according to the first aspect of the invention, there is a greater incremental increase in the expansion of an upper sub-layer relative to a lower adjacent sub-layer. As a result, the build up of pressure within the electrode layer as a whole is reduced, internal stresses are minimised and the electrode exhibits more stable behaviour over the lifetime of a battery cell including the electrode. In addition the capacity per unit volume of the cell can be increased compared to the situation where the first composite layer does not contain any major electroactive components of the second composite layer.

Similarly, a second composite layer may comprise more than 50 wt % of a second major electroactive component, which exhibits a volume increase of greater than 90% and up to 40 wt % of a second electroactive component which exhibits a volume increase of no more than 30%. Preferably, the second major electroactive component comprises more than 60 wt % of the second composite layer, preferably more than 70 wt %, especially more than 75 wt %. Preferably, the first electroactive component comprises no more than 30 wt %, preferably no more than 20 wt %. Suitably the first electroactive component comprises at least 1 wt %, preferably at least 2 wt % and especially at least 10 wt % of the composite layer. The second composite layer may comprise sub-layers. The concentration of the second major electroactive component each sub-layer suitably increases on passing from sub-layer to sub-layer in a direction perpendicular to the current collector. The concentration of the first electroactive component may decrease or may remain the same. This arrangement of layers means that, on charging a battery cell including an electrode according to the first aspect of the invention, there is a greater incremental increase in the expansion of an upper sub-layer relative to a lower adjacent sub-layer. As a result, the build up of pressure within the electrode layer as a whole is reduced, internal stresses are minimised and the electrode exhibits more stable behaviour over the lifetime of a battery cell including the electrode. In addition the capacity per unit volume of the cell can be increased compared to the situation where the second composite layer does not contain any major electroactive components of the first composite layer.

A non-elastic polymer binder can be used to bind a composite layer comprising multiple sub-layers providing the concentration of the major electroactive component, which exhibits a volume increase of no more than 30% does not drop below 50 wt %. However, it will be appreciated that the cohesiveness of the layer as a whole can be improved by tailoring the composition of the binder to the composition of the composite layer. For example, the binder may comprise a co-polymer or a mixture of a non-elastomeric polymer and an elastomeric polymer, wherein the binder comprises from 100 wt % to 55 wt % of a non-elastic binder and from 0 to 45 wt % of an elastic binder. Preferably the non-elastic binder is PVDF. Preferably the elastic binder is NaPAA.

An elastic polymer binder can be used to bind a composite layer comprising multiple sub-layers providing the concentration of the major electroactive component, which exhibits a volume increase of at least 90% does not drop below 50 wt % of the total weight of the electroactive material in the composite. However, it will be appreciated that the cohesiveness of the layer as a whole can be improved by tailoring the composition of the binder to the composition of the composite layer. For example, the binder may comprise a co-polymer or a mixture of a non-elastomeric polymer and an elastomeric polymer, wherein the binder comprises from 100 wt % to 55 wt % of an elastic binder and from 0 to 45 wt % of a non-elastic binder. Preferably the non-elastic binder is PVDF. Preferably the elastic binder is NaPAA.

Optionally, the major active component of the second composite anode layer has an intrinsic capacity of greater than 500 mAh/g. Optionally, the major active component of the first composite anode layer has an intrinsic capacity of less than 400 mAh/g.

The theoretical specific capacity of one sub-layer differs from the theoretical specific capacity of an adjacent sub-layer within a composite layer of a multi-layer electrode. Where a composite layer comprises two or more sub-layers, the theoretical specific capacity of an upper sub-layer is suitably greater than that of a lower sub-layer.

In a preferred arrangement, the conductivity of the first composite anode layer is higher than that of the second composite anode layer.

In a preferred arrangement, the first composite anode layer has higher density than the second composite anode layer. Where the first active material comprises sub-layers comprising a mixture of the first major electroactive component and a second electroactive component, the concentration of the first major electroactive component is suitably greater than that of the second electroactive component.

In a preferred arrangement, the intrinsic capacity provided by the active materials of the second composite anode layer is higher than that provided by the first composite anode layer.

Suitably the porosity of the first composite layer is different to that of the second composite layer. In a preferred arrangement, the porosity of the second composite anode layer is higher than that of the first composite anode layer. The porosity of the first composite layer is suitably greater than 5 vol %. Preferably the porosity of the first composite layer is less than 50 vol %, more preferably less than 30 vol % and especially in the range 20 to 25 vol %.

The porosity of the second composite layer is suitably less than 80 vol %. The porosity of the second composite layer is suitably greater than 20 vol %. It is especially preferred that the porosity of the second composite layer is in the range 30 to 70 vol %.

Where each composite layer comprises two or more sub-layers, the porosity of one sub-layer may be the same or different to that of an adjacent sub-layer. Preferably the porosity of an upper sub-layer is greater than that of an adjacent lower sub-layer within a composite layer of the electrode.

The major active components in both the first composite layer and the second composite layer comprise particulate materials. The particles of each material may be provided in different morphological states. Examples of different morphologies include native particles, fibres, wires, tubes, flakes, ribbons, structured particles, porous particles, porous particle fragments and scaffold structures. The major electroactive component of each composite electroactive layer or sub-layer may comprise particles of one type of morphology or a mixture of morphologies. Preferably the particles of a major active component within one sub-layer are all of the same morphology.

In a preferred arrangement, the first composite anode layer 203a contains graphite as the major active component and the second composite anode layer 203b contains silicon as the major active component.

Graphite does not undergo significant expansion and contraction upon insertion and release of metal ions. Accordingly, the binder used for a composite anode layer containing graphite as the major active component need not be selected from materials capable of accommodating expansion of the active material, for example PVDF. Furthermore, the lack of significant expansion of graphite means that the concentration of active material in a layer having graphite as the major active component may be relatively high as compared to a layer having silicon (or another material that undergoes a significant volume increase) as the major active component in which the concentration may be lower to allow for expansion of silicon upon metal insertion.

Preferably the graphite comprises spherical graphite particles, for example, SFG6 graphite particles of the type sold by Timcal®.

A composite anode layer containing graphite as a major active component may contain at least 30 grams per square meter (gsm) of graphite, optionally at least 40 gsm, optionally at least 50 gsm.

A composite anode layer containing a material that undergoes a volume increase V1 of at least 90% as a major active component may contain no more than 20 gsm or no more than 10 gsm of the major active component.

Suitable binders for a composite anode layer containing silicon as the major active component include binders that can accommodate, i.e. allow expansion of the silicon during charging and discharging, such as polyacrylic acid and salts of polyacrylic acids, for example alkali, alkali earth or transition metal salts of polyacrylic acid. Copolymers or mixtures of polyacrylic acid type binders with an elastomoeric binder may also be used, providing the co-polymer or mixture comprises more than 50 wt % PAA. Copolymers or mixtures of polyimide (PI) and carboxymethylcelluoseor CMC and or styrene butadiene rubber (SBR) may also be used, providing the co-polymer or mixture thereof comprises more than 50 wt % PI.

A first composite anode layer 203a containing graphite as the major active component may have higher conductivity and/or a higher capacity per unit volume than a second composite anode layer 203b containing silicon as the major active component. The lack of significant expansion of graphite upon metal insertion may allow for a lower porosity first composite anode layer 203a and a higher concentration of graphite and/or conductive additives per unit volume of the first composite anode layer 203a than in the second composite anode layer 203b. High conductivity of the first composite anode layer 203a may allow for low contact resistance between anode current collector layer 201 and the first composite anode layer 203a. Porosity of a composite electrode layer may be increased by inclusion of a material such as oxalic acid.

It will be understood that good contact between the electrolyte 205 and the active material of the composite anode layers is required for efficient charging and discharging of the battery 200. Active material(s) contained in second composite anode layer 203b of a lithium ion battery 200 may be partially or completely lithiated upon charging of the battery. There may be little or no charging of active material contained in the first composite anode layer 203a until second composite anode layer 203b has been fully lithiated. The active material(s) of the first composite anode layer 203a may undergo complete lithiation, partial lithiation or no lithiation, depending on the driving conditions during charging of the battery 200. Accordingly, a relatively low porosity of the first composite anode layer 203a may have little or no effect on efficiency of charging and discharging due to a majority of metal ion insertion and release occurring in the second composite anode layer 203b.

Each of the first and second composite electrode layers may be formed by depositing a slurry of the components of each layer in a liquid using a suitable coating method, for example spin-coating, dip-coating or doctor-blade coating. Doctor-blade coating is preferred. Suitable liquids include water, organic solvents and mixtures thereof. Additional coating methods that can be used include spray coating techniques, particularly electrostatic coating techniques, powder coating, spin coating, vertical coating, dip coating and chemical vapour deposition.

Doctor blade coating techniques are particularly suitable for forming homogeneous single layers on the substrate of a multi-layer electrode. Composite layers comprising two or more sub-layers are suitably formed using spray coating techniques, particularly electrostatic coating techniques and spin coating techniques.

Following deposition of the slurry used to form a first composite anode layer 203a containing graphite as the major active component, and during or after evaporation of the liquid or liquids of the slurry, pressure may be applied to the first composite anode layer. This application of pressure may reduce resistivity and improve adhesion between the first composite anode layer 203a and the conductive current collector layer 201. This reduction in resistivity may be due to an increase in the contact surface area between active materials of the first composite anode layer 203a and current collector layer 201 and/or an increase in the concentration of conductive material per unit volume of the first composite anode layer 203a. Furthermore, application of pressure may increase the charge capacity per unit volume of the first composite anode layer 203a. A suitable method for application of pressure is calendering.

Sub-layers comprising a mixture comprising more than 50 wt % of a first electroactive component that undergoes a relatively low volume change upon metal insertion or alloying and less than 40 wt % of a second electroactive component that undergoes a relatively large volume change upon metal insertion or alloying may also be calendared to increase the capacity per unit volume of the composite layer. However, the extent of calendaring will depend on the relative proportions of the first and second electroactive components and the composition of the binder in the sub-layer.

Preferably, the second composite anode layer 203b containing silicon as the major active component has relatively high porosity to allow for expansion of silicon. Preferably, pressure is not applied on formation of such a layer, or a lower pressure is applied as compared to the pressure applied to the first composite anode layer 203a, in order to maintain its relatively high porosity.

In an alternative embodiment, a composite anode layer comprising as the major active component an active material that undergoes a relatively small volume change upon metal insertion or alloying, for example graphite, is formed on a substrate and pressure is applied to this layer, for example by calendaring. On this layer is formed another composite anode layer comprising as the major active component an active material that undergoes a relatively large volume change upon metal insertion or alloying, for example silicon, and a conductive layer is formed over both layers.

Inverting this structure gives a composite electrode structure in which the first composite electrode layer contains as the major active component a material that undergoes a relatively large volume change upon metal insertion or alloying, and an overlying second electrode layer to which pressure has been applied without the same pressure being applied to the first composite electrode layer.

A slurry for forming a composite anode layer having graphite as the major active component may have a graphite concentration of 1 g/cm$^3$ to 2 g/cm$^3$, preferably 1.4 to 1.7 g/cm$^3$ and a slurry for forming a composite anode layer having silicon as the major active component may have a silicon concentration of at least 0.1 g/cm$^3$ and up to 1.5 g/cm$^3$, preferably between 0.2 and 1 g/cm$^3$. The thickness of the layers or sub-layers can be controlled by varying the concentration of the solids in the slurry. In general a dilute slurry can be used to prepare a thinner layer or sub-layer.

Different liquids or liquid compositions may be used to deposit different composite anode layers. In order to prevent or minimise mixing of adjacent composite anode layers, the liquid or liquids of a slurry used to deposit a composite anode layer onto an underlying composite anode layer may be selected from liquids in which the binder of the slurry is soluble, but in which the binder of the underlying composite anode layer is sparingly soluble or completely insoluble. The slurry used to form the overlying layer may contain a binder and a solvent or solvent mixture for the binder wherein the binder has a solubility of greater than 1 weight % or greater than 3 weight % in the solvent or solvent mixture at room temperature. The binder of the underlying composite anode layer may have a solubility of less than 0.1 weight % or less than 0.05 weight % at room temperature in the solvent or solvent mixture contained in the slurry used to form the overlying layer.

A material such as oxalic acid may be included in the slurry used to form the first or second composite electrode layer to increase the porosity of that layer. Alternatively the slurry may be prepared using a multi-component solvent comprising two or more solvents, wherein a first solvent boils at a lower temperature than the other. On formation of a slurry layer on a substrate surface, the first solvent having the lower boiling point is removed from during the initial drying process to leave a composite material, which includes within its volume molecules of a second solvent having a higher boiling point; this can be removed by further heating the composite material to at least a temperature at which the second solvent evaporates to form a composite material including pores or voids within its structure. Both complete composite layers and sub-layers can be formed using these techniques.

As an alternative to depositing a slurry containing the binder in polymeric form, a slurry may be used as described above but wherein some or all of the polymeric binder is replaced with monomeric material. Upon deposition of the slurry, the monomers may be polymerised to form the binder. Suitable polymerisation methods include electropolymerisation, radical initiated polymerisation, condensation polymerisation and addition polymerisation. The use of monomeric species, which can be polymerised to polymeric binder species after deposition onto a substrate has been found to be particularly advantageous in the formation of sub-layers. Better control of layer thickness can be achieved using solutions comprising monomers rather than polymers.

A contact adhesive may be used between adjacent composite anode layers having different binders. Exemplary contact adhesives include polymers with characteristics of the binders of each of the adjacent composite anode layers, such as a copolymer of VDF and acrylic acid or acid salt in the case of adjacent composite anode layers in which one layer contains a polyacrylic acid or acid salt binder and the other layer contains a PVDF binder. A layer of contact adhesive may further comprise conductive components such as VGCF, carbon nano-tubes and flakes to enhance the conductivity of the multi-layer electrode.

The binder for the first composite electrode layer preferably binds strongly to the conductive layer 209.

The thickness of the first composite electrode layer 203*a* is preferably in the range of about 20-40 microns. The thickness of the second composite electrode layer 203*b* is preferably in the range of 5-20 microns. Preferably, the second composite electrode layer 203*b* is thinner than the first composite electrode layer 203*a*.

In further embodiments, devices of the invention may be as described with reference to FIG. 2, but may contain three or more anode layers, each layer containing at least a binder and an electroactive material, wherein the composition of at least two, optionally all, of the three or more layers is different. If more than two composite anode layers are present then the major active component of two or more of the composite anode layers may be the same, provided that the major active component of at least two of the composite anode layers are different. If more than two layers are present then the composite anode layer closest to the cathode preferably has the highest porosity of the composite anode layers present, and the major active component of this layer preferably has the highest intrinsic capacity of the composite anode layers.

Current Collector

Anode current collector layer 201 may be formed from any conductive material, preferably a metal or metal alloy. Exemplary metals and alloys are copper, nickel, steel and titanium. Conductive carbon is an example of a non-metallic conductive material that may be used to form anode current collector layer 201. The anode current collector layer provides a substrate on which the composite anode layers may be formed.

As an alternative to the distinct layer of FIG. 2, the anode current collector may extend into the first composite anode layer for increased contact between the current collector and the components of the first composite anode. The anode current collector may contain conductive elongate fingers or a conductive mesh extending laterally along at least part of the length of the first composite anode layer.

Active Materials

Preferred active particulate materials include: materials consisting essentially of doped or undoped silicon; composite silicon-containing active materials that contain doped or undoped silicon and one or more further elements or compounds; composite graphite-containing active materials that may contain graphite and one or more further elements; or compounds or that may consist essentially of graphite, each of which may have any structure as described below.

Exemplary particulate active graphite materials include particles of natural and artificial graphite such as mesocarbon micro-beads, hard carbon and massive artificial graphite. Specific examples are available as Timrex® SFG6, SFG10, SFG15, KS4 or KS6 manufactured by Timcal Ltd.

The particles may have any shape and may be, without limitation, elongate particles such as rods, fibres, tubes or wires; scaffold structures; spherical, spheroid or cuboid shapes; and flakes. A powder of elongate particles may contain elongate particles that are isolated from each other or bundles of the elongate particles, for example bundles of elongate tubes or fibres.

The particles may have a size with a largest dimension up to about 100 µm, preferably less than 50 µm, more preferably less than 30 µm. The particles may have at least one smallest dimension less than 25 µm. The smallest dimension may be more than 0.5 nm. The smallest dimension of a particle is defined as the size of the smallest dimension of an element of the particle such as the diameter for a rod, fibre or wire, the smallest diameter of a cuboid or spheroid or the smallest average thickness for a ribbon, flake or sheet where the particle may consist of the rod, fibre, wire, cuboid, spheroid, ribbon, flake or sheet itself or may comprise the rod, fibre, wire, cuboid, spheroid, ribbon, flake or sheet as a structural element of the particle.

Wires, fibres, rods or ribbons may have smallest dimensions as the diameter or minimum thickness of up to 2 microns, optionally about 0.1 microns and may have lengths of more than 1 µm, optionally more than 5 µm with aspect ratios of at least 2:1, optionally at least 5:1, at least 10:1, at least 100:1 or at least 1000:1. The smallest dimensions may be at least about 10 nm. The ribbons may have widths that are at least twice the minimum thickness, optionally at least five times the minimum thickness.

Flakes may have a thickness of at least 20 nm, and a thickness of up to about 20 microns or 10 microns, 2 microns, optionally about 0.1 microns, and other dimensions in the range of 5-50 microns.

Particle size distribution may be measured using laser diffraction methods, for example susing a MasterSizer® or optical digital imaging methods. A distribution of the particle sizes of a powder of starting material particles used to form pillared particles may be measured by laser diffraction, in which the particles being measured are typically assumed to be spherical, and in which particle size is expressed as a spherical equivalent volume diameter, for example using the Mastersizer™ particle size analyzer available from Malvern Instruments Ltd. Size distribution of particles in a powder measured in this way may be expressed as a diameter value Dn in which at least n % of the volume of the powder is formed from particles have a measured spherical equivalent volume diameter equal to or less than D.

In a powder of the active particles, preferably at least 20%, more preferably at least 50% of the volume of the powder is formed from particles having a diameter Dn in the ranges defined herein.

Surface area per unit mass of the active particles measured using the BET (Brunauer, Emmett and Teller) technique may be in the range of 0.1 $m^2/g$. Preferably it is more than 1 $m^2/g$ and more preferably it is more than 5 $m^2/g$. Surface area per unit mass is preferably less than 200 $m^2/g$. Preferably it is less than 100 $m^2/g$, more preferably it is less than 60 $m^2/g$ or less than 50 $m^2/g$, most preferably it is less than 35 $m^2/g$.

Active particulate materials may be structured particles, for example particles having a core and pillars, preferably microporous or mesoporous pillars, extending from the core, and particles having pores on the particle surface or pores throughout the particle volume.

A surface of a macroporous particle may have a substantially continuous network of the particle material at a surface of the particle with spaces, voids or channels within the material that may have dimensions of at least 50 nm. Such voids may be present throughout the particle volume or may be restricted to regions of the particle. A particle may have regions of pillars and regions of pores. Porous particles may have pore wall thickness of at least 50 nm and up to 100 nm. Porous particles may have a material thickness of at least 30 nm and up to 120 nm.

Preferred structured particles are structured silicon including pillared particles of silicon and porous silicon, and structured silicon composite particles.

Porous silicon, either in a bulk form or in a particulate form, may be crushed to provide porous silicon having a surface area and capacity within a desired range. Herein the use of porous particle fragments is also included within the scope of the invention.

In the case of pillared particles the particle may be selected from one of the following:
  a particle having a silicon core with silicon pillars extending from and integral with the silicon core
  a particle having a non-silicon core of a conductive material, for example a graphite core, with silicon pillars extending from the core; and
  a particle having a non-silicon core of a conductive material, for example a graphite core, coated with a silicon shell and having silicon pillars extending from and integral with the silicon shell.

The pillars may be core-shell structures, the inner core being of a different material to the outer shell material and where the core and/or shell contains silicon. In the case where the core and pillars are of different materials, the core may or may not be an electroactive material, for example a conductive non-active material, such as a conductive carbon.

Pillared particles may have a pillar mass fraction (PMF) in the range of 15-50%, 20-40% or 25-25%, wherein PMF is given by mass of pillars/total mass of pillared particles.

Figure 3A:
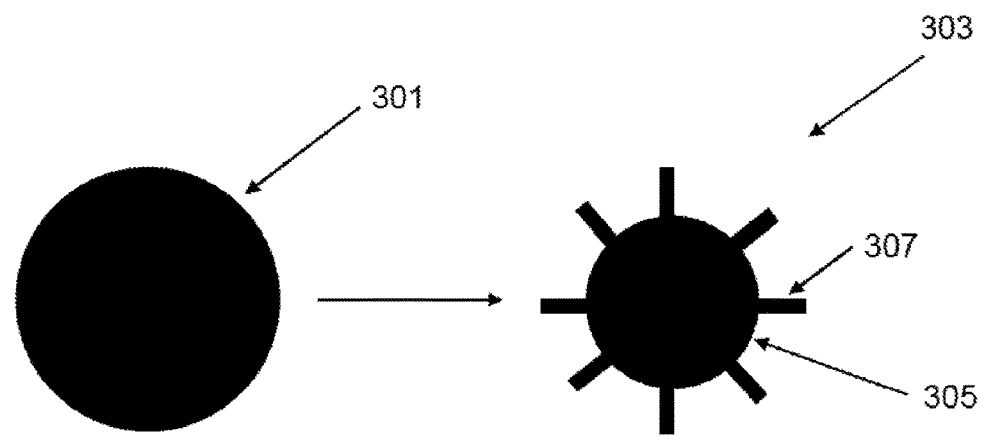
FIGS. 3a and 3b illustrate methods of forming pillared particles.

FIG. 3A illustrates a first method of forming pillared particles wherein a starting material is etched to form a pillared particle wherein a starting material 301 is exposed to an etching formulation for selective etching at the surface of the starting material to produce a pillared particle 303 having a core 305 and pillars 307.

It will be appreciated that the volume of the particle core of the pillared particle formed by this method is smaller than the volume of the starting material, and the surface of the core is integral with the pillars. The size of the pillared particle may be the same as or less than the size of the starting material.

A suitable process for etching a material having silicon at its surface, either to form pores in the silicon or to form pillars extending from an etched silicon surface, is metal-assisted chemical etching (alternatively called galvanic exchange etching or galvanic etching) which comprises treatment of the starting material with hydrogen fluoride, a source of metal ions, for example silver or copper, which electrolessly deposit onto the surface of the silicon and an oxidant, for example a source of nitrate ions. More detail on suitable etching processes can be found in, for example, Huang et al., Adv. Mater. 23, pp 285-308 (2011).

The etching process may comprise two steps, including a step in which metal is formed on the silicon surface of the starting material and an etching step. The presence of an ion that may be reduced is required for the etching step. Exemplary cations suitable for this purpose include nitrates of silver, iron (III), alkali metals and ammonium. The formation of pillars is thought to be as a result of etching selectively taking place in the areas underlying the electrolessly deposited metal.

The metal deposition and etching steps may take place in a single solution or may take place in two separate solutions.

Metal used in the etching process may be recovered from the reaction mixture for re-use, particularly if it is an expensive metal such as silver.

Exemplary etching processes suitable for forming pillared particles are disclosed in WO 2009/010758 and in WO 2010/040985.

Other etching processes that may be employed include reactive ion etching, and other chemical or electrochemical etching techniques, optionally using lithography to define the pillar array.

If the pillared particle comprises a first material at its core centre with a shell formed from a second material, for example carbon coated with silicon, then this particle may be formed by etching of silicon-coated carbon to a depth of less than the thickness of the silicon shell in order to form a pillared particle with a composite carbon/silicon core.

Etching may be to a depth of less than 2-10 microns, optionally at least 0.5 microns, to form pillars having a height of up to 10 microns. The pillars may have any shape. For example, the pillars may be branched or unbranched; substantially straight or bent; and of a substantially constant thickness or tapering.

Figure 3B:
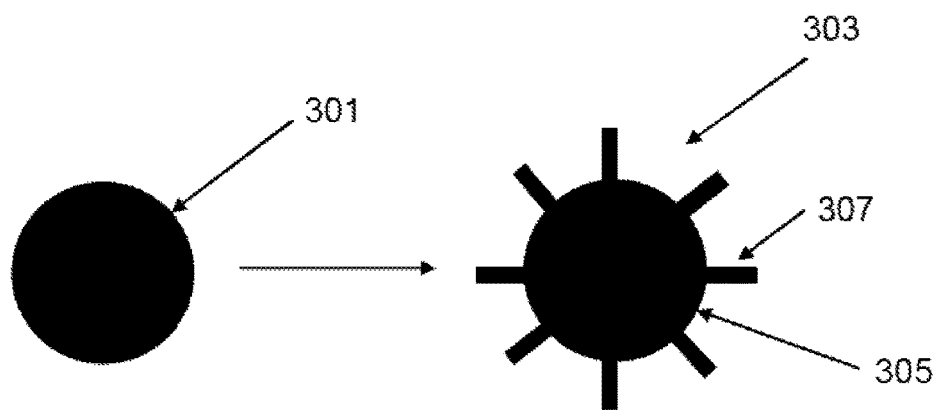

The pillars may be formed on or attached to a particle core using methods such as growing, adhering or fusing pillars onto a core or growing pillars out of a core. FIG. 3B illustrates a second method of forming pillared particles wherein pillars 307, preferably silicon pillars, for example silicon nanowires, are grown on or attached to a starting material 301 such as a silicon or carbon (e.g. graphite or graphene) starting material. The volume of the particle core 305 of the resultant pillared particle 303 may be substantially the same as the volume of the starting material 301. In other words, the surface of the starting material may provide the surface of the particle core 305 from which the pillars 307 extend.

Exemplary methods for growing pillars include chemical vapour deposition (CVD) and fluidised bed reactors utilising the vapour-liquid-solid (VLS) method. The VLS method comprises the steps of forming a liquid alloy droplet on the starting material surface where a wire is to be grown followed by introduction in vapour form of the substance to form a pillar, which diffuses into the liquid. Supersaturation and nucleation at the liquid/solid interface leads to axial crystal growth. The catalyst material used to form the liquid alloy droplet may for example include Au, Ni or Sn.

Nanowires may be grown on one or more surfaces of a starting material.

Pillars may also be produced on the surface of the starting material using thermal plasma or laser ablation techniques.

The pillars may also be formed by nanowire growth out of the starting material using methods such as a solid-liquid-solid growth technique. In one example silicon or silicon-based starting material granules are coated with catalyst particles (e.g. Ni) and heated so that a liquid alloy droplet forms on the surface whilst a vapour is introduced containing another element. The vapour induces condensation of a product containing the starting material and the other element from the vapour, producing growth of a nanowire out of the starting material. The process is stopped before all of the starting material is subsumed into nanowires to produce a pillared particle. In this method the core of the pillared particle will be smaller than the starting material.

Silicon pillars grown on or out of starting materials may be grown as undoped silicon or they may be doped by introducing a dopant during the nanowire growth or during a post-growth processing step.

The pillars are spaced apart on the surface of the core. In one arrangement, substantially all pillars may be spaced apart. In another arrangement, some of the pillars may be clustered together.

The starting material for the particle core is preferably in particulate form, for example a powder, and the particles of the starting material may have any shape. For example, the starting material particles may be cuboid, cuboidal, substantially spherical or spheroid or flake-like in shape. The particle surfaces may be smooth, rough or angular and the particles may be multi-faceted or have a single continuously curved surface. The particles may be porous or non-porous. The morphology of the particles can be determined using optical techniques known to a person skilled in the art. Scanning Electron Microscopy (SEM) can be used to determine the morphology of a particle.

A cuboid, multifaceted, flake-like, substantially spherical or spheroid starting material may be obtained by grinding a precursor material, for example doped or undoped silicon as described below, and then sieving or classifying the ground precursor material. Exemplary grinding methods include power grinding, jet milling or ball milling. Depending on the size, shape and form of the precursor material, different milling processes can produce particles of different size, shape and surface smoothness. Flake-like particles may also be made by breaking up/grinding flat sheets of the precursor material. The starting materials may alternatively be made by various deposition, thermal plasma or laser ablation techniques by depositing a film or particulate layer onto a substrate and by removing the film or particulate layer from the substrate and grinding it into smaller particles as necessary.

The starting material may comprise particles of substantially the same size. Alternatively, the starting material may have a distribution of particle sizes. In either case, sieves and/or classifiers may be used to remove some or all starting materials having maximum or minimum sizes outside desired size limits.

In the case where pillared particles are formed by etching a material comprising silicon, the starting material may be undoped silicon or doped silicon of either the p- or n-type or a mixture, such as silicon doped with germanium, phosphorous, aluminium, silver, boron and/or zinc. It is preferred that the silicon has some doping since it improves the conductivity of the silicon during the etching process as compared to undoped silicon. The starting material is optionally p-doped silicon having $10^{19}$ to $10^{20}$ carriers/cc.

Silicon granules used to form the pillared particles may have a silicon-purity of 90.00% or over by mass, for example 95.0% to 99.99%, optionally 98% to 99.98%.

The starting material may be relatively high purity silicon wafers used in the semiconductor industry formed into granules. Alternatively, the granules may be relatively low purity metallurgical grade silicon, which is available commercially and which may have a silicon purity of at least 98%; metallurgical grade silicon is particularly suitable because of the relatively low cost and the relatively high density of defects (compared to silicon wafers used in the semiconductor industry). This leads to a low resistance and hence high conductivity, which is advantageous when the pillar particles or fibres are used as anode material in rechargeable cells. Impurities present in metallurgical grade silicon may include Iron, Aluminium, Nickel, Boron, Calcium, Copper, Titanium, and Vanadium, oxygen, carbon, manganese and phosphorus. Certain impurities such as Al, C, Cu, P and B can further improve the conductivity of the starting material by providing doping elements. Such silicon may be ground and graded as discussed above. An example of such silicon is "Silgrain™" from Elkem of Norway, which can be ground and sieved (if necessary) to produce silicon granules, that may be cuboidal and/or spheroidal.

The granules used for etching may be crystalline, for example mono- or poly-crystalline with a crystallite size equal to or greater than the required pillar height, although it will be understood that an amorphous starting material may also be etched. The polycrystalline granules may comprise any number of crystals, for example two or more.

Where the pillared particles are made by a growth of silicon pillars as described above, the starting material may comprise an electroactive or non-electroactive material, and may comprise metal or carbon based particles. Carbon based starting materials may comprise soft carbon, hard carbon, natural and synthetic graphite, graphite oxide, fluorinated graphite, fluorine-intercalated graphite, graphene.

Graphene based starting materials may comprise particles comprising a plurality of graphene nanosheets (GNS) and/or oxidised graphene nanosheets (ox-GNS) or nano Graphene Platelets (NGP). Methods of making graphene particles include exfoliation techniques (physical, chemical or mechanical), unzipping of MWCNT or CNT, epitaxial growth by CVD and the reduction of sugars.

The core of the silicon-comprising particles illustrated in FIGS. 3a and 3b are substantially spherical, however the particle core may have any shape, including substantially spherical, spheroidal (oblate and prolate), and irregular or regular multifaceted shapes (including substantially cube and cuboidal shapes). The particle core surfaces from which the pillars extend may be smooth, rough or angular and may be multi-faceted or have a single continuously curved surface. The particle core may be porous or non-porous. A cuboidal core may be in the form of a flake, having a thickness that is substantially smaller than its length or width such that the core has only two major surfaces.

The aspect ratio of a pillared particle core having dimensions of length L, width W and thickness T is a ratio of the length L to thickness T (L:T) or width W to thickness T (W:T) of the core, wherein the thickness T is taken to be the smallest of the 3 dimensions of the particle core. The aspect ratio is 1:1 in the case of a perfectly spherical core. Prolate or oblate spheroid, cuboidal or irregular shaped cores preferably have an aspect ratio of at least 1.2:1, more preferably at least 1.5:1 and most preferably at least 2:1. Flake like cores may have an aspect ratio of at least 3:1. Aspect ratios can also be determined by optical techniques known to a person skilled in the art.

In the case of a substantially spherical core, pillars may be provided on one or both hemispheres of the core. In the case of a multifaceted core, pillars may be provided on one or more (including all) surfaces of the core. For example, in the case of a flake core the pillars may be provided on only one of the major surfaces of the flake or on both major surfaces.

The core material may be selected to be a relatively high conductivity material, for example a material with higher conductivity than the pillars, and at least one surface of the core material may remain uncovered with pillars. The at least one exposed surface of the conductive core material may provide higher conductivity of a composite anode layer comprising the pillared particles as compared to a particle in which all surfaces are covered with pillars.

Porous particles can be made using a number of methods, such as those disclosed in EP2321441. In particular, precipitated silicon can be isolated from the bulk alloy by etching away the bulk metal, provided the etching method does not etch the silicon structures but does etch the metal. Etchants may be liquid or gaseous phase and may include additives or sub-processes to remove any by-product build up which slows etching. Etching can be done chemically, e.g. (in the case of Al) using ferric chloride, or electrochemically using copper sulphate/sodium chloride electrolytes. The vast majority of known aluminium etchants/methods do not attack the fine Si structures, leaving them intact after the aluminium has been etched away. Any aluminium or aluminium silicide intermetallics remaining after etching, for example adhering to the crystalline silicon, can be tolerated when the silicon is used to form an anode as they are themselves excellent Li-ion anode candidates, and so long as any aluminium and intermetallic structures have comparable thickness to the silicon they can be expected to survive Li insertion cycling. In fact, aluminium and intermetallics may also aid in making electrical contact between the silicon and metal electrode.

After fully etching away the metal matrix, the silicon structures will be released into the etchant. These will generally need cleaning to remove contaminants, by-products (e.g. aluminium hydroxide in caustic etching) and remnants generated during etching, which may be achieved using acids or other chemicals, followed by rinsing and separating the silicon structures from the liquid, which may be achieved by filtering, centrifuging or other separation method. The structures may then be handled in liquid suspension.

Binders

Exemplary binders include polyimide, polyacrylic acid (PAA) and metal salts thereof, in particular alkali metal salts thereof, polyvinylalchol (PVA) and polyvinylidene fluoride (PVDF), sodium carboxymethylcellulose (Na-CMC), Styrene-Butadiene Rubber (SBR) and optionally, non-active conductive additives. Co-polymers and mixtures of binders may also be used. The relative proportions of each monomer in a co-polymer or each polymer in a polymer mixture will depend on the composition of the major active components within a layer or a sub-layer.

The weight average molecular weight (Mw) of the binder may be selected according to the desired solubility of the binder in a given solvent or solvent mixture. For example, PVDF may have a Mw in the range of about 200,000 to 1,500,000 Da, and PAA may have a Mw in the range of about 400,000 to 3,500,000.

The molecular weight of a polymer or copolymer can be readily determined using techniques well known to a person skilled in the art. Examples of suitable techniques include static light scattering, small angle neutron scattering, X-ray scattering and a determination of the sedimentation velocity of a sample of a polymer or copolymer in a solvent.

A binder may be provided in an amount of at least 0.5 weight % and no greater than 20 weight % of a composite anode layer. For example, a binder may be provided in the range of 0.5-20 weight % of the composite anode layer.

The present inventors have found that device performance may be improved by selecting the binder for a composite anode layer according to the major active component of that layer.

A binder may be selected according to one or more of: the degree of cohesion provided for a given active material; the ability of the binder to accommodate expansion of the active material; and the solvents in which the binder is soluble.

For example, the relatively high intrinsic capacity of active silicon means that silicon undergoes substantial expansion upon metal insertion. Accordingly, a binder for a layer having silicon as the major active component is preferably selected from materials capable of accommodating this expansion with limited or no cracking. The binder for an active material that undergoes substantial expansion may be a non-elastomeric polymer. Exemplary binders suitable for active silicon that provide good cohesion of the silicon particles and allow for expansion of the composite anode are polyacrylic acid (PAA) and salts thereof, for example, sodium polyacrylate (NaPAA), polyethylene maleic anhydride/maleic acid (PEMA), sodium polyethylene maleic anhydride/acid NaPEMA, polyvinyl alcohol (PVA), polyamides, polyimides, polyanilines, polypyrroles, polysiloxanes, polythiophene, polyphenylene sulphide, polypyrene, polycarbazole, polyindole, polyazepine, polyquinolene, polyquinoxalene, poly(perfluorosulfonic acid), sulfonated polytetrafluoroethylene and sulfonated polyether ketone, eumelanin and derivatives thereof. PAA and salts thereof are particularly preferred.

The binder for a material that does not undergo substantial expansion may be an elastomeric polymer. Graphite does not undergo substantial expansion upon metal insertion, and so the binder used for a layer having graphite as the major active component need not be capable of accommodating substantial expansion, but preferably does provide good cohesion for graphite particles. Exemplary binders used for a layer having graphite as the major active component are polyvinylidene fluoride (PVDF), styrene butadiene rubber (SBR), polyphenylene vinylene, poly(fluorene), polynaphthalene, polyarylvinylene, carboxymethylcellulose (CMC) and polyacetylene. PVDF is particularly preferred.

Binders comprising a mixture of an elastic and a non-elastic polymer or co-polymer may be used where the active material comprises a mixture of an electroactive material having a volume expansion of less than or equal to 30% and an electroactive material having a volume expansion of greater than 90 Vol %. The composition of the co-polymer binder will depend on the relative proportions in which the electroactive material having a volume expansion of less than or equal to 30% and an electroactive material having a volume expansion of greater than 90 Vol % are present.

The binders for adjacent composite anode layers may be soluble in different solvents. For example, a binder for a first composite anode layer may be soluble in non-polar solvents and substantially insoluble in polar solvents, and a binder for a second, adjacent composite anode layer may be soluble in polar solvents and substantially insoluble in non-polar solvents.

A layer or sub-layer comprising up to 80 wt % of an electroactive component comprising 10 wt % of silicon and 90 wt % graphite may comprise a binder comprising 10 wt % NaPAA and 90 wt % PVDF. Suitably the layer or sub-layer is prepared by mixing each component with a solution of its compatible binder to form a slurry and then mixing the two slurries to form a slurry comprising a mixture of both the active materials and the binders. For example, a first slurry is prepared by mixing a solution of PVDF in NMP with graphite particles as an electroactive material. A second slurry is prepared by mixing a solution of NaPAA in water with silicon particles. The first and second slurries are then combined in a desired proportion to give a composite sub-layer comprising a mixture of silicon and graphite.

Additives

Each composite anode layer may independently contain one or more particulate non-active conductive additives, for example carbon fibres, carbon nanotubes, ketjen black, lamp black, acetylene black, pitch black and graphene. Mixtures of carbon black can be used. A specific example comprises a mix comprising vapour grown carbon fibres (VGCF), carbon nano-tubes (CNT) and ketjen black EC600. Where present, additives may be provided in an amount in the range 0.25-20 weight %, optionally 0.25-10 wt % of the composition. Examples of carbon fibres include VGCF and mesophase pitch based carbon fibres.

Cell Fabrication

Methods of depositing layers or sub-layers on electrode substrates such as current collectors include doctor blade spreading, spray coating, electrostatic coating, spin coating, powder coating, vertical coating, dip coating and chemical vapour deposition. The coating parameters associated with many of these techniques is known to a person skilled in the art.

The slurry may be deposited on a current collector, which may be as described above. Further treatments may be done as required, for example to directly bond the silicon particles to each other and/or to the current collector. Binder material or other coatings may also be applied to the surface of the composite electrode layer after initial formation.

Examples of suitable cathode materials include $LiCoO_2$, $LiCo_{0.99}Al_{0.01}O_2$, $LiNiO_2$, $LiMnO_2$, $LiCO_{0.5}Ni_{0.5}O_2$, $LiCO_{0.7}Ni_{0.3}O_2$, $LiCO_{0.8}Ni_{0.2}O_2$, $LiCO_{0.82}Ni_{0.18}O_2$, $LiCO_{0.8}Ni_{0.15}Al_{0.05}O_2$, $LiNi_{0.4}Co_{0.3}Mn_{0.3}O_2$ and $LiNi_{0.33}CO_{0.33}Mn_{0.34}O_2$. The cathode current collector is generally of a thickness of between 3 to 500 µm. Examples of materials that can be used as the cathode current collector include aluminium, stainless steel, nickel, titanium and sintered carbon. The electrolyte is suitably a non-aqueous electrolyte containing a lithium salt and may include, without limitation, non-aqueous electrolytic solutions, solid electrolytes and inorganic solid electrolytes. Examples of non-aqueous electrolyte solutions that can be used include non-protic organic solvents such as propylene carbonate, ethylene carbonate, butylenes carbonate, dimethyl carbonate, diethyl carbonate, gamma butyro lactone, 1,2-dimethoxy ethane, 2-methyl tetrahydrofuran, dimethylsulphoxide, 1,3-dioxolane, formamide, dimethylformamide, acetonitrile, nitromethane, methylformate, methyl acetate, phosphoric acid trimester, trimethoxy methane, sulpholane, methyl sulpholane and 1,3-dimethyl-2-imidazolidione.

Examples of organic solid electrolytes include polyethylene derivatives polyethyleneoxide derivatives, polypropylene oxide derivatives, phosphoric acid ester polymers, polyester sulphide, polyvinyl alcohols, polyvinylidine fluoride and polymers containing ionic dissociation groups.

Examples of inorganic solid electrolytes include nitrides, halides and sulphides of lithium salts such as $Li_5NI_2$, $Li_3N$, LiI, $LiSiO_4$, $Li_2SiS_3$, $Li_4SiO_4$, LiOH and $Li_3PO_4$.

The lithium salt is suitably soluble in the chosen solvent or mixture of solvents. Examples of suitable lithium salts include LiCl, LiBr, LiI, $LiClO_4$, $LiBF_4$, $LiBC_4O_8$, $LiPF_6$, $LiCF_3SO_3$, $LiAsF_6$, $LiSbF_6$, $LiAlCl_4$, $CH_3SO_3Li$ and $CF_3SO_3Li$.

Where the electrolyte is a non-aqueous organic solution, the battery is provided with a separator interposed between the anode and the cathode. The separator is typically formed of an insulating material having high ion permeability and high mechanical strength. The separator typically has a pore diameter of between 0.01 and 100 µm and a thickness of between 5 and 300 µm. Examples of suitable electrode separators include a micro-porous polyethylene film.

EXAMPLES

General Device Fabrication Process—Comparative Hybrid Devices

Swagelok™-style test cells having a single composite hybrid anode layer were constructed using an anode having a composition of an active silicon material and graphite as the active materials, the elongate conductive carbon additive VGCF available from Showa Denko and a PVDF binder available from BOC. The composite anode layer was deposited from a slurry of the composite layer components onto a 10 µm thick copper foil. An NCA cathode ($Li_{1+x}Ni_{0.8}CO_{0.15}Al_{0.05}O_2$) on an aluminium foil and a Tonen separator between the two electrodes was used. The electrodes and separator were wetted with an electrolyte solution of 1M $LiPF_6$ in EC/EMC containing VC (vinylene carbonate, 3 wt %), FEC (fluoroethylene carbonate, 10 wt %) and $CO_2$ (0.2 wt %) as additives.

VC is available from Hangzhou Sinolite Industrial of China.

EC is available from Pharmablock of China.

EMC is available from Shenyang Meiyao Chem. Ltd of China.

PAA is available from Shanghai Yuking Chem Tech Co Ltd of China.

The components of the anode were provided in the weight ratio 85:9:3:3 graphite:silicon:VGCF:binder.

General Device Fabrication Process—Example Bilayer Devices

Devices were prepared according to the general process for comparative devices except that two composite anode layers were formed.

A first composite anode layer was formed on the copper foil by depositing a slurry containing the components graphite:VGCF:PVDF9400 in a 94:3:3 weight ratio to form a coat weight of 65 grams of graphite per m² (gsm). The slurry contained 1.6 grams of graphite per cubic centimeter.

A second composite anode layer was formed on the first composite anode layer by depositing a slurry containing the components active silicon:PAANa:SFG6:Cmix in a 70:14:12:4 weight ratio in which PAANa is the sodium salt of polyacrylic acid; SFG6 is Timrex® SFG6 graphite particles manufactured by Timcal Ltd; and Cmix is a 5:5:2 weight mix of, respectively, carbon nanotubes, VGCF carbon nanofibres available from Showa Denko, and EC600 carbon black material available from AzkoNobel.

The coat weight was 65 grams of graphite per m². The slurry contained 6 grams of active silicon per m².

Comparative and exemplary devices were prepared using active silicon selected from silicon fibres; silicon particles; pillared silicon particles of a silicon core with silicon pillars extending therefrom; and porous silicon (including porous particle fragments).

Silicon particles are available as "Silgrain™" powder from Elkem of Norway having a purity of 99.86%, a Seebeck coefficient of 148 μV/K and a BET value of 5.2.

Pillared silicon particles were prepared by etching starting "Silgrain™" particles by a process as described in WO 2009/010758.

Silicon fibres were prepared by detaching pillars from pillared silicon particles prepared by etching silicon particles having a purity greater than 99.5 wt %.

Porous silicon was prepared by etching an Al—Si matrix material by a process as described in WO 2012/028857.

The table 2 below shows how the silicon structure (including diameter, length and surface area) affect the first cycle loss and number of cycles that the cell can undergo before it reaches 80% of its initial capacity.

devices with a bilayer anode structure, and "hybrid" devices having a single composite anode layer containing all active materials.

With reference to devices containing pillared silicon particles, first cycle loss is substantially lower and number of cycles to 80% of capacity is substantially higher for exemplary bilayer devices as compared to the comparative hybrid devices.

"First cycle loss" as used anywhere herein means the proportion of the initial charge capacity of the battery that is lost during the first charge and discharge cycle of the battery. "Number of cycles to 80% capacity" as used anywhere herein means the number of charge and discharge cycles of the battery that are possible before the initial charge capacity of the battery drops below 80%.

Hybrid half cells were prepared using an electrode composition comprising graphite, silicon, vapour grown carbon fibres and PVDF binder in a ratio 85:9:3:3. The material was cast onto the current collector to a thickness of 66 gsm and having a density of 1.5 g/cc. A lithium cathode and a Tonen separator were used. An electrolyte comprising a 1.2M solution of LiPF6 in a solvent comprising 1 part by volume of ethyl carbonate (EC), 3 parts by volume ethyl methyl

TABLE 2

Experimental data for hybrid and bi-layer cells indicating first cycle loss and number of cycles to 80% capacity.

| Silicon Material | Cell Structure | Cell Type | Diameter of silicon material μm* | Length of silicon material | BET of silicon material m²/g | Porosity of silicon material | First Cycle Loss | Number of cycles to 80% capacity |
|---|---|---|---|---|---|---|---|---|
| Powder particle | Hybrid | Half cell | $D_{10}$ = 2.80<br>$D_{50}$ = 4.6<br>$D_{90}$ = 7.6 | — | 5.2 | — | 35% | <10 |
| | Hybrid | Full cell | $D_{10}$ = 2.80<br>$D_{50}$ = 4.6<br>$D_{90}$ = 7.6 | — | 5.2 | — | — | — |
| | Bi-layer | Full cell | $D_{10}$ = 2.80<br>$D_{50}$ = 4.6<br>$D_{90}$ = 7.6 | — | 5.2 | — | — | — |
| Fibre silicon | Hybrid wafer | Half cell | — | — | — | — | 27% | ~6 |
| | Bi-layer f-Si from wafer | Half cell | — | — | — | — | 6.5% | 20 |
| | Bi-layer | Full cell | 100-900 nm (av. 330 nm) | 1.35-8.5 μm (av. 4.25 μm) | 174 | 0.33 cc/g | 32% | 60 |
| | Bi-layer | Full cell | 60-640 nm (av. 290 nm) | 1.13-4.35 μm (av 2.99 μm) | 51.5 m2/g | 0.1616 cc/g | 20% | 40 |
| Pillared particle silicon PMF = 43% | Hybrid | Half cell | $D_{10}$ = 2.4<br>$D_{50}$ = 4.3<br>$D_{90}$ = 7.5 | 1 μm | 19.7 m2/g | — | 24% | 4-8 |
| | Bi-layer | Half cell | $D_{10}$ = 2.4<br>$D_{50}$ = 4.3<br>$D_{90}$ = 7.5 | 1 μm | 19.7 m2/g | — | 11.5% | 60 |
| | Bi-layer | Full cell | $D_{10}$ = 2.4<br>$D_{50}$ = 4.3<br>$D_{90}$ = 7.5 | 1 μm | 19.7 m2/g | — | 12.7% | 60 |
| Porous silicon | Hybrid | Half cell | $D_{10}$ = 0.82<br>$D_{50}$ = 2.3<br>$D_{90}$ = 5.93 | — | 27.3 m2/g | 0.64 cc/g | — | — |
| | Bilayer | Half cell | $D_{10}$ = 0.82<br>$D_{50}$ = 2.3<br>$D_{90}$ = 5.93 | — | 27.3 m2/g | 0.64 cc/g | 8.5% | 140 |
| | Bi-layer | Full cell | $D_{10}$ = 0.82<br>$D_{50}$ = 2.3<br>$D_{90}$ = 5.93 | — | 27.3 m2/g | 0.64 cc/g | 15% | 40 |

As shown in Table 1, above, values for first cycle losses and number of cycles to 80% capacity were obtained for carbonate (EMC), 15 wt % fluoro ethyl carbonate (FEC) and 3 wt % vinylcarbonate (VC) was used.

Swagelock™ half cells were formed by charging the cells at a charge rate of c/25 for one cycle between 1 and 0.005 V. The battery was charged by either charging at a rate of c/5 for 2 h at constant voltage or at a rate of c/20 at constant current. The cells were discharged at a rate of c/5 at constant voltage.

Hybrid full cells were prepared by using an electrode composition as described above having an anode capacity of 1.2 mAhcm$^{-2}$, a cathode having a capacity of 2.7 mAhcm$^{-2}$ and a separator and electrolyte as described above. Swagelock™ full cells were formed by charging the cells at a charge rate of c/25 for one cycle between 1 and 0.005 V. The battery was charged by either charging at a rate of c/5 for 2 h at constant voltage or at a rate of c/20 at constant current. The cells were discharged at a rate of c/5 at constant voltage.

Bi-layer half cells were prepared by forming an anode comprising a first graphite layer comprising graphite, vapour grown carbon fibres (VGCF) and a polyvinylidenefluoride binder in a ratio 94:3:3 and comprising 70 gsm active graphite on a copper current collector. A second silicon layer comprising active silicon, sodium polyacrylate binder, graphite and a conductive carbon in a ratio 70:14:12:4 and comprising 8 gsm active silicon was applied over the first layer. A lithium cathode and a Tonen™ separator was used. The anode, cathode and separator were combined together in a Swagelock™ cell and an electrolyte comprising a 1.2M solution of LiPF6 in a solvent comprising 1 part by volume of ethyl carbonate (EC), 3 parts by volume ethyl methyl carbonate (EMC), 15 wt % fluoro ethyl carbonate (FEC) and 3 wt % vinylcarbonate (VC) was added.

The bi-layer half cell was formed by charging and discharging for one cycle at a charging rate of c/25 between a voltage of 1 and 0.005V (based on an estimated cap of 4 mAh). The cell was then cycled by charging at c/5 at constant voltage for 2 h or at c/20 at a constant current and discharging at c/5.

The bi-layer full cell was prepared using the bi-layer anode described above having a capacity of 1.2 mAh/cm2, a cathode having a capacity of 2.7 mAh/cm2, a Tonen™ separator and a electrolyte composition as described above. The anode, cathode, separator and electrolyte were assembled into a Swagelock™ cell. The cells were formed by charging at c/25 between 3 and 4.3V for one charge/discharge cycle. The cells were then charged at c/3 between 3 and 4.2V under constant current constant voltage conditions.

Figure 4:
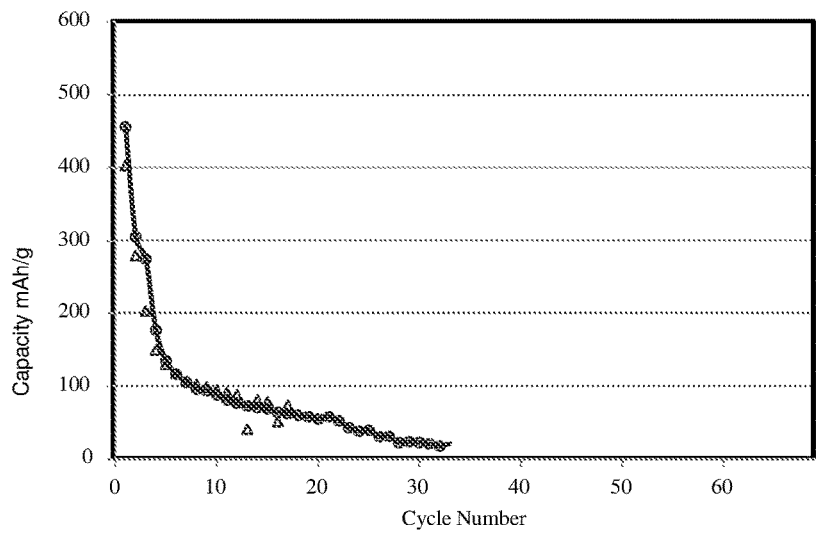
FIG. 4 illustrates the capacity of a hybrid half cell according to an embodiment of the invention.

FIG. 4 illustrates the capacity vs number of cycles for a Swagelock™ half cell comprising a hybrid anode and lithium cathode. Anode material comprises a mixture of graphite, powdered (unetched) silicon powder, VGCF & PVDF binder in a ratio of 85:9:3:3. The cathode of the cell is lithium.

Figure 5:
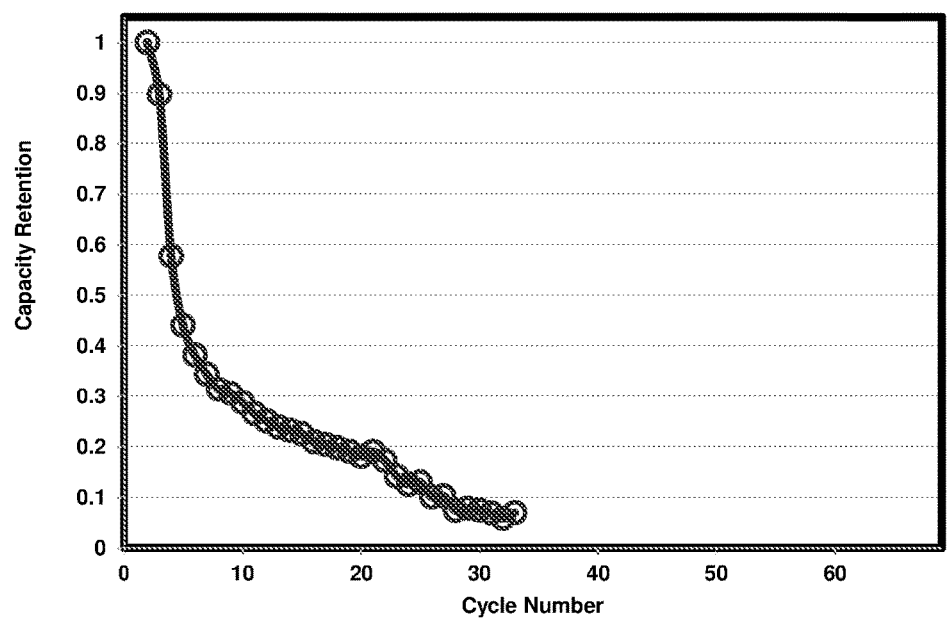
FIG. 5 illustrates the capacity retention of a hybrid half cell according to an embodiment of the invention.

FIG. 5 illustrates the capacity retention vs number of cycles for a Swagelock™ hybrid half cell as used in FIG. 4. The hybrid half cell comprises un-etched silicon powder having a D50 radius of approximately 4.6 μm.

Figure 6:
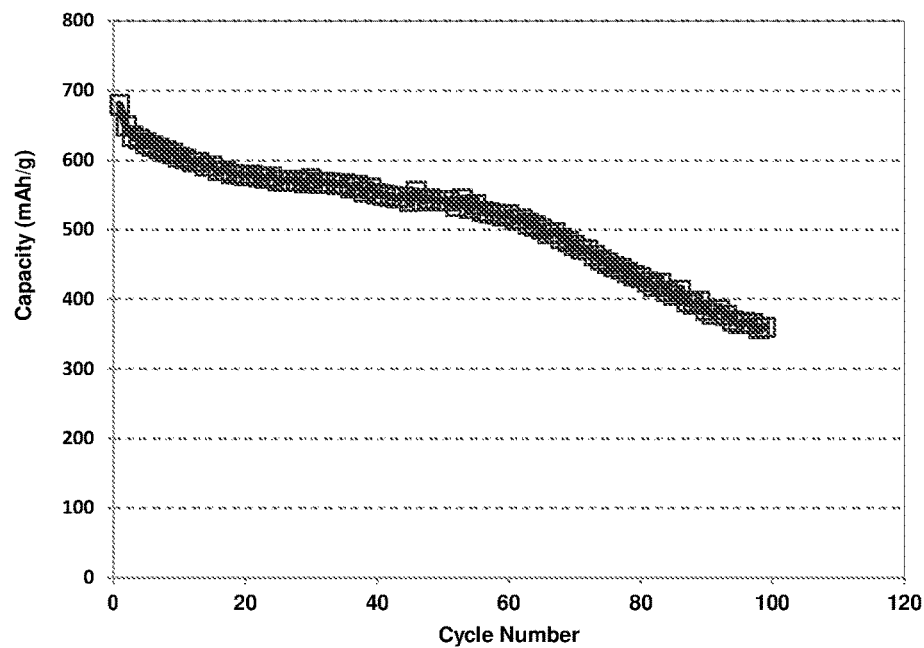
FIG. 6 illustrates the capacity of a half cell comprising a bi-layer anode and lithium cathode according to an embodiment of the invention.

FIG. 6 illustrates the capacity vs number of cycles for a Swagelock™ half cell comprising a bi-layer anode and lithium cathode. Anode material comprises a bilayer comprising a first graphite layer and a second layer comprising pp-Si from powdered silicon powder, PAA binder, VGCF & graphite in a ratio of 70:14:12:4. The graphite layer is formed from graphite, VGCF and PVDF binder in a ratio of 94:3:3. The cathode of the cell is lithium.

Figure 7:
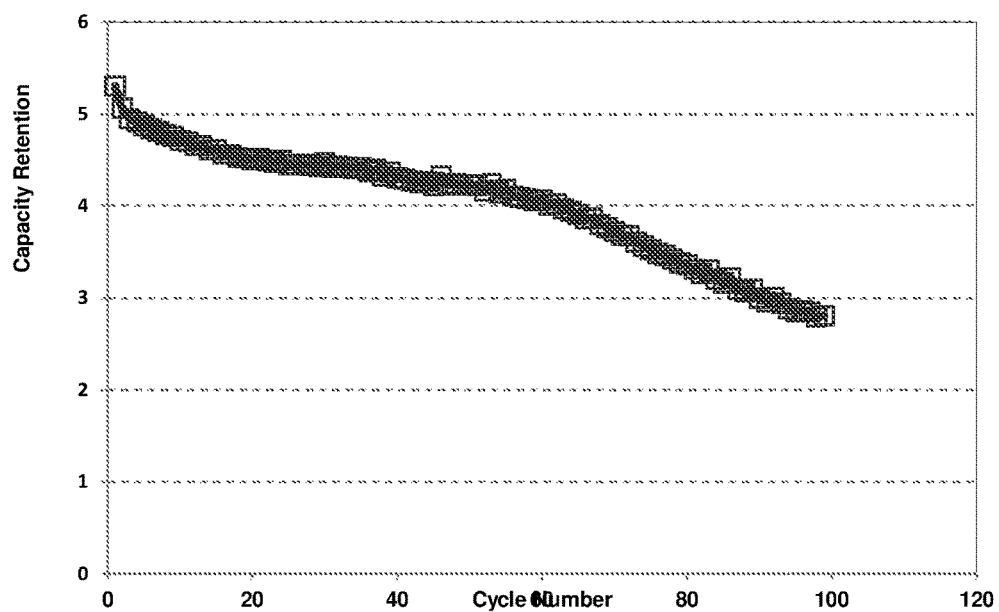
FIG. 7 illustrates the capacity retention for a full bi-layer cell according to an embodiment of the invention.

FIG. 7 illustrates the capacity retention for a full bi-layer cell comprising pp-Si as an active material in the Si layer.

Figure 8:
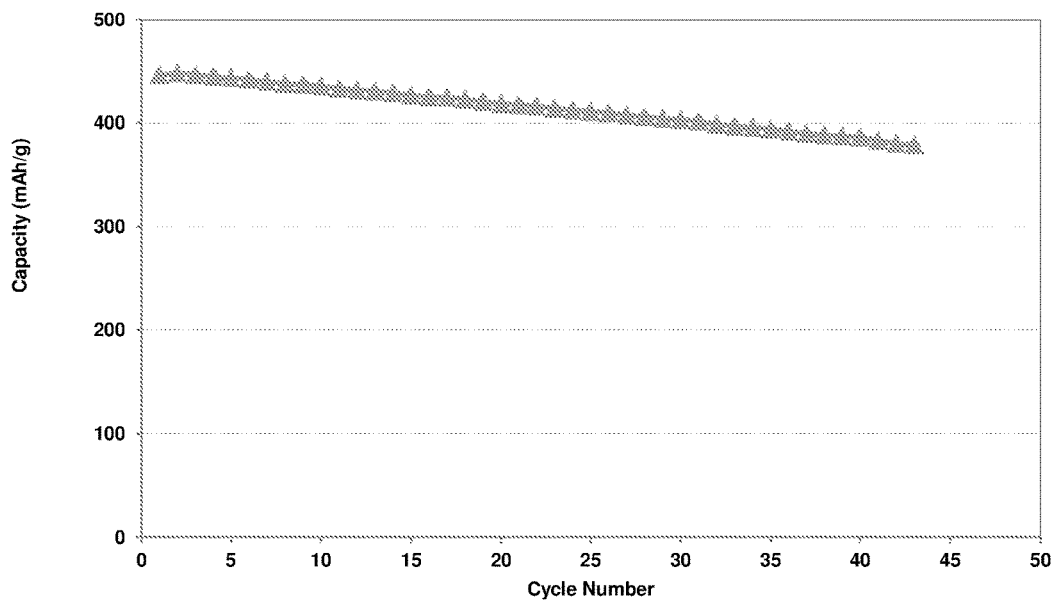
FIG. 8 illustrates the capacity vs number of cycles for a bi-layer for a bi-layer full cell according to an embodiment of the invention.

FIG. 8 illustrates the capacity vs number of cycles for a bi-layer full cell, in which the cathode comprises a first layer of a graphite based material and a second layer comprising pillared particles of silicon having an average diameter of 4.6 μm. The first layer is formed from graphite, VGCF, PVDF binder in a ratio of 94:3:3 cast to a thickness of 70 gsm and containing 1.6 g/cc active graphite. The second layer comprises pp-Si, sodium polyacrylate binder graphite and a conductive carbon in a ratio of 70:14:12:4 and containing 8 gsm active silicon. The anode has a capacity of 1.2 mAh/cm². The cathode has a capacity of 2.7 mAh/cm².

Figure 9:
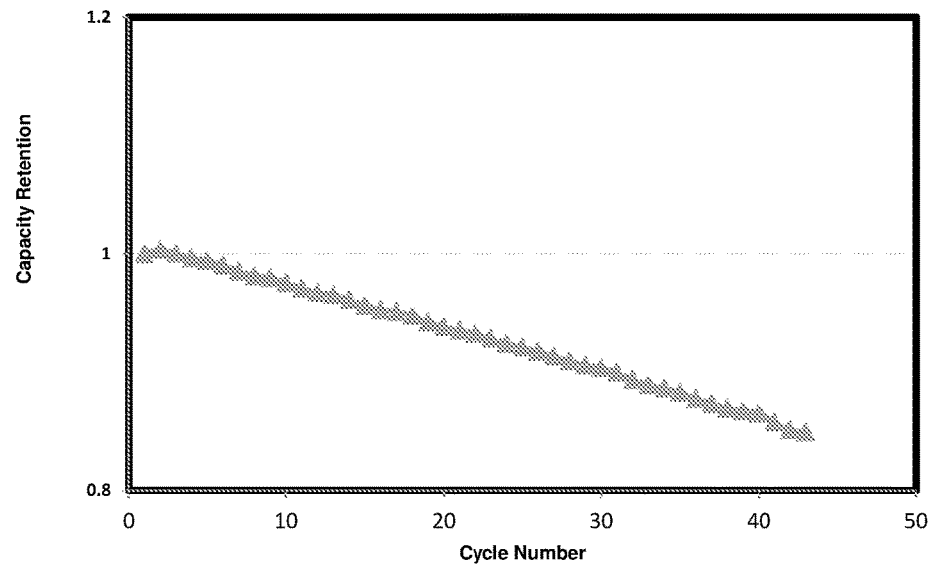
FIG. 9 illustrates the capacity retention vs number of cycles for a bi-layer full cell according to an embodiment of the invention.

FIG. 9 illustrates the capacity retention vs number of cycles for a bi-layer full cell, in which the anode comprises a first layer of a graphite based material and a second layer comprising pillared particles of silicon having an average diameter of 4.6 μm.

Figure 10:
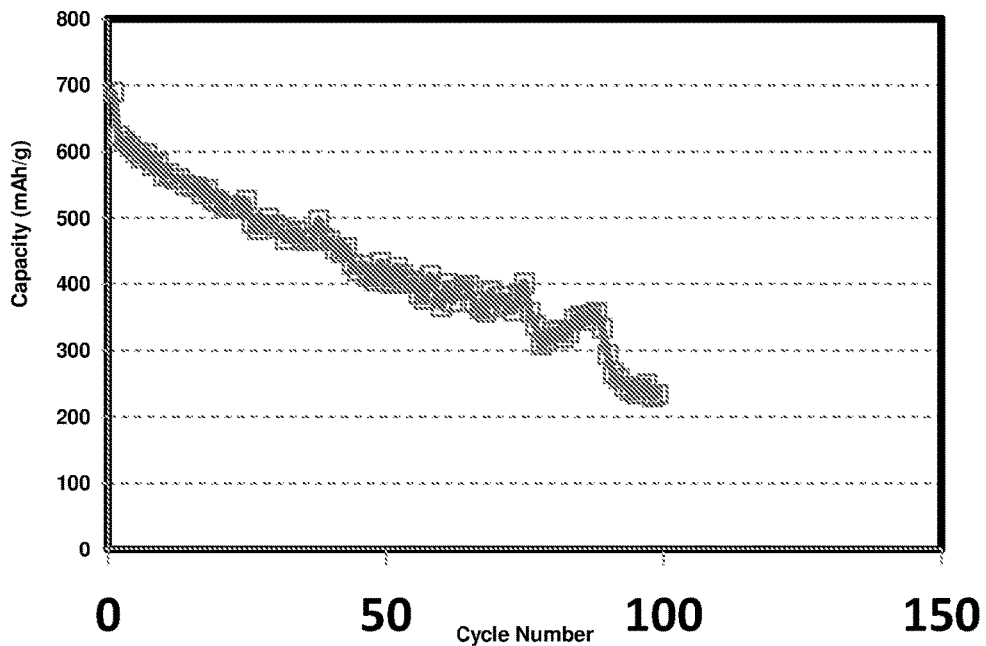
FIG. 10 illustrates the capacity vs number of cycles for a bi-layer half cell according to an embodiment of the invention.

FIG. 10 illustrates capacity vs number of cycles for a bi-layer half cell in which the anode comprises a first layer comprising graphite, vapour grown carbon fibres and PVDF binder in a ratio of 94:3:3 cast to a thickness of 70 gsm having 1.6 g/cc of active graphite and a second layer comprising wafer derived silicon fibres, sodium polyacrylate binder, graphite and a conductive carbon in a ratio of 70:14:12:4 cast to a thickness of 8 gsm of active Si. The cathode is lithium.

Figure 11:
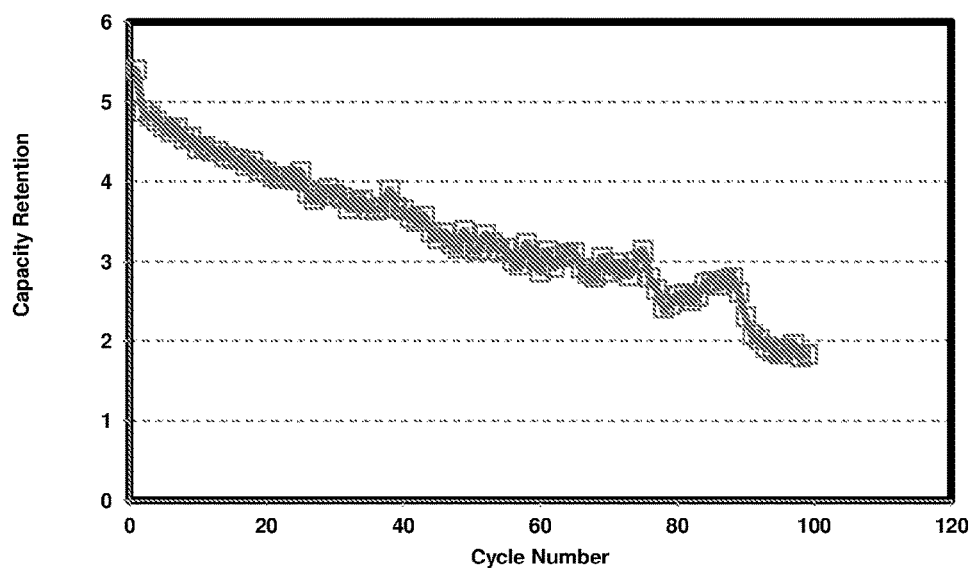
FIG. 11 illustrates the capacity retention vs number of cycles for a bi-layer half cell according to an embodiment of the invention.

FIG. 11 illustrates the capacity retention vs number of cycles for a bi-layer half cell in which the anode comprises a first layer comprising graphite, vapour grown carbon fibres and PVDF binder in a ratio of 94:3:3 cast to a thickness of 70 gsm having 1.6 g/cc of active graphite and a second layer comprising wafer derived silicon fibres, sodium polyacrylate binder, graphite and a conductive carbon in a ratio of 70:14:12:4 cast to a thickness of 8 gsm of active Si. The cathode is lithium.

Figure 12:
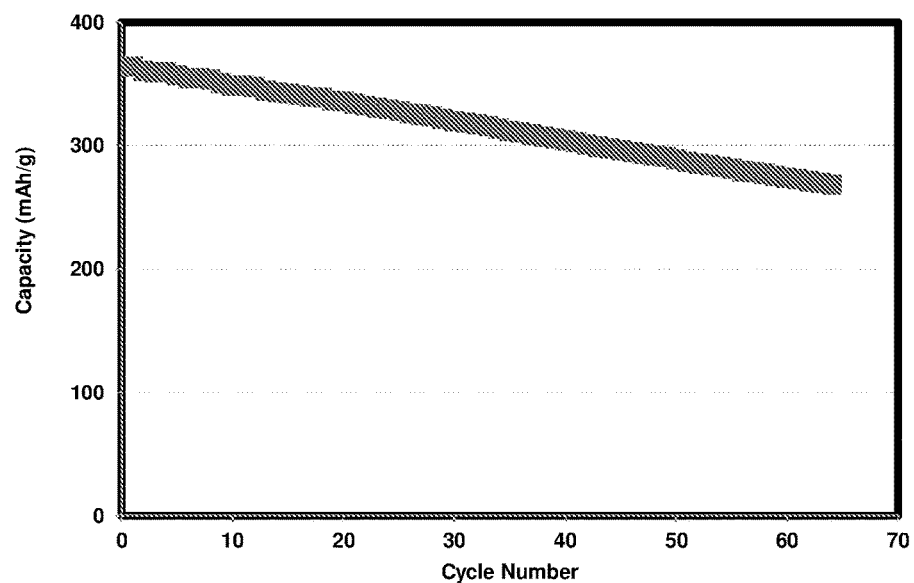
FIG. 12 illustrates the capacity vs number of cycles for a bi-layer full cell according to an embodiment of the invention.

FIG. 12 illustrates the capacity vs number of cycles for a bi-layer full cell in which the anode comprises a first layer comprising graphite, vapour grown carbon fibres and PVDF binder in a ratio of 94:3:3 cast to a thickness of 70 gsm having 1.6 g/cc of active graphite and a second layer comprising silicon fibres having a BET of 174 m2/g and a porosity of 0.33 cc/g, sodium polyacrylate binder, graphite and a conductive carbon in a ratio of 70:14:12:4 cast to a thickness of 8 gsm of active Si. The anode has a capacity of 1.2 mAh/cm2. A cathode having a capacity of 2.7 mAh/cm2 is used.

Figure 13:
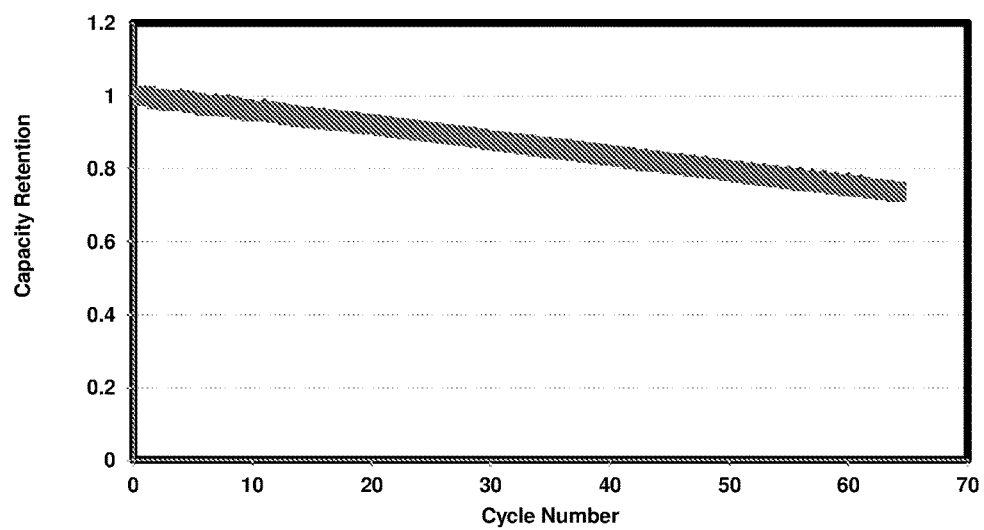
FIG. 13 illustrates the capacity retention vs number of cycles for a bi-layer full cell according to an embodiment of the invention.

FIG. 13 illustrates the capacity retention vs number of cycles for a bi-layer full cell in which the anode comprises a first layer comprising graphite, vapour grown carbon fibres and PVDF binder in a ratio of 94:3:3 cast to a thickness of 70 gsm having 1.6 g/cc of active graphite and a second layer comprising silicon fibres having a BET of 174 m2/g and a porosity of 0.33 cc/g, sodium polyacrylate binder, graphite and a conductive carbon in a ratio of 70:14:12:4 cast to a thickness of 8 gsm of active Si. The anode has a capacity of 1.2 mAh/cm2. A cathode having a capacity of 2.7 mAh/cm2 is used.

Figure 14:
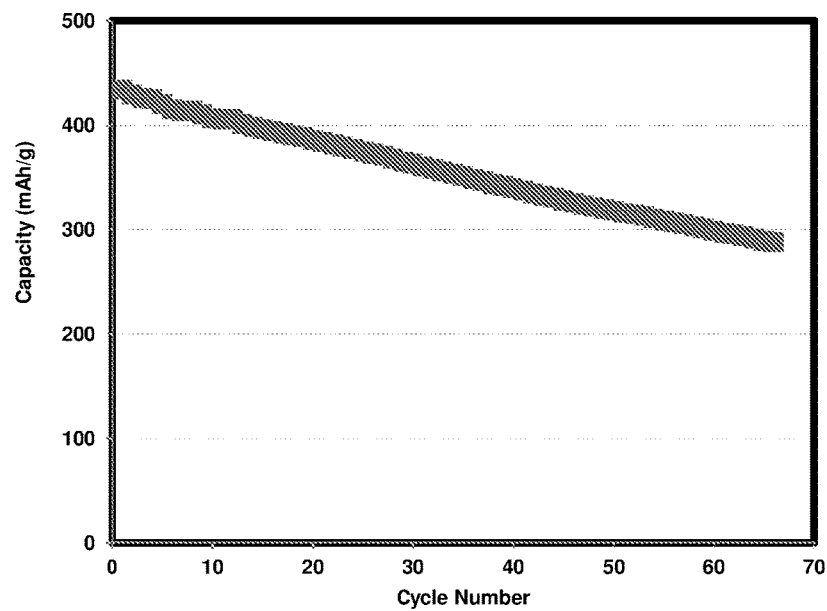
FIG. 14 illustrates the capacity vs number of cycles for a bi-layer full cell according to an embodiment of the invention.

FIG. 14 illustrates the capacity vs number of cycles for a bi-layer full cell in which the anode comprises a first layer comprising graphite, vapour grown carbon fibres and PVDF binder in a ratio of 94:3:3 cast to a thickness of 70 gsm having 1.6 g/cc of active graphite and a second layer comprising silicon fibres having a BET of 51.5 m2/g and a porosity of 0.1616 cc/g, sodium polyacrylate binder, graphite and a conductive carbon in a ratio of 70:14:12:4 cast to a thickness of 8 gsm of active Si. The anode has a capacity of 1.2 mAh/cm2. A cathode having a capacity of 2.7 mAh/cm2 is used.

Figure 15:
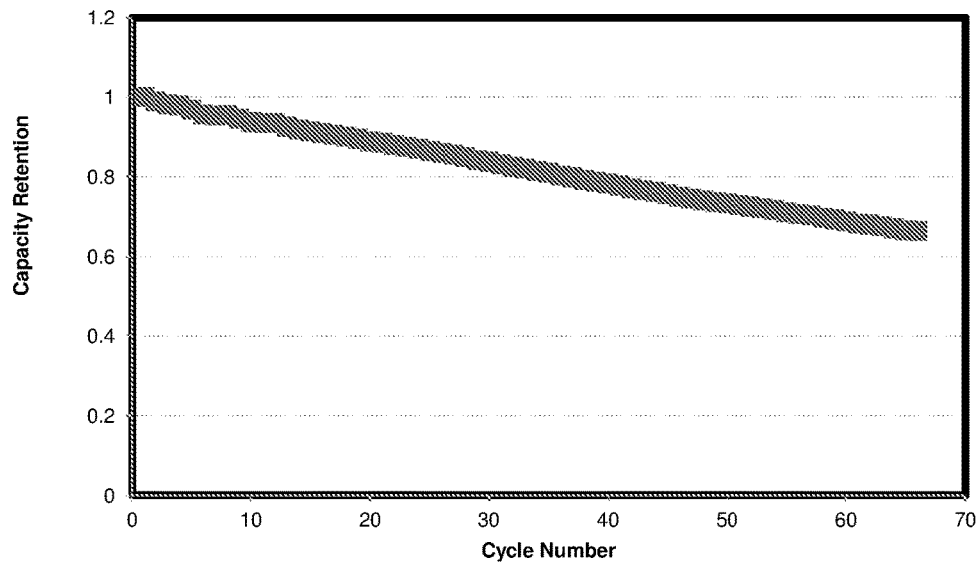
FIG. 15 illustrates the capacity retention vs number of cycles for a bi-layer full cell according to an embodiment of the invention.

FIG. 15 illustrates the capacity retention vs number of cycles for a bi-layer full cell in which the anode comprises a first layer comprising graphite, vapour grown carbon fibres and PVDF binder in a ratio of 94:3:3 cast to a thickness of 70 gsm having 1.6 g/cc of active graphite and a second layer comprising silicon fibres having a BET of 51.5 m2/g and a porosity of 0.1616 cc/g, sodium polyacrylate binder, graphite and a conductive carbon in a ratio of 70:14:12:4 cast to a thickness of 8 gsm of active Si. The anode has a capacity of 1.2 mAh/cm2. A cathode having a capacity of 2.7 mAh/cm2 is used.

Figure 16:
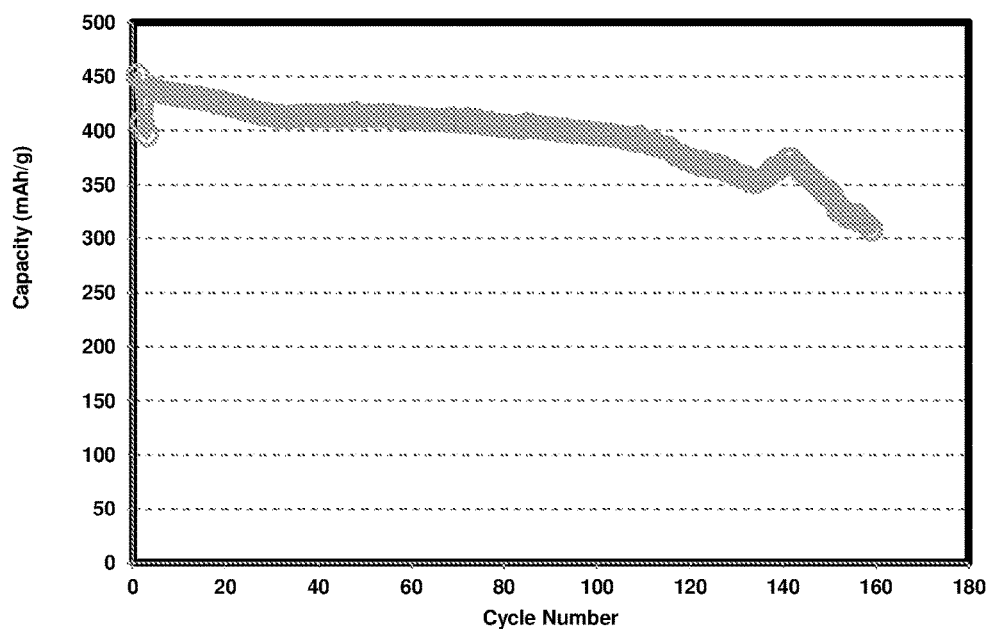
FIG. 16 illustrates the capacity vs number of cycles for a bi-layer half cell according to an embodiment of the invention.

FIG. 16 illustrates the capacity vs number of cycles for a bi-layer half cell in which the anode comprises a first layer comprising graphite, vapour grown carbon fibres and PVDF binder in a ratio of 94:3:3 cast to a thickness of 71 gsm having 1.6 g/cc of active graphite and a second layer comprising etched aluminium silicon derived silicon BET of 27.3 m2/g and a porosity of 0.64 cc/g, sodium polyacrylate binder, graphite and a conductive carbon in a ratio of 70:14:12:4 cast to a thickness of 8 gsm of active Si. The cathode is lithium.

Figure 17:
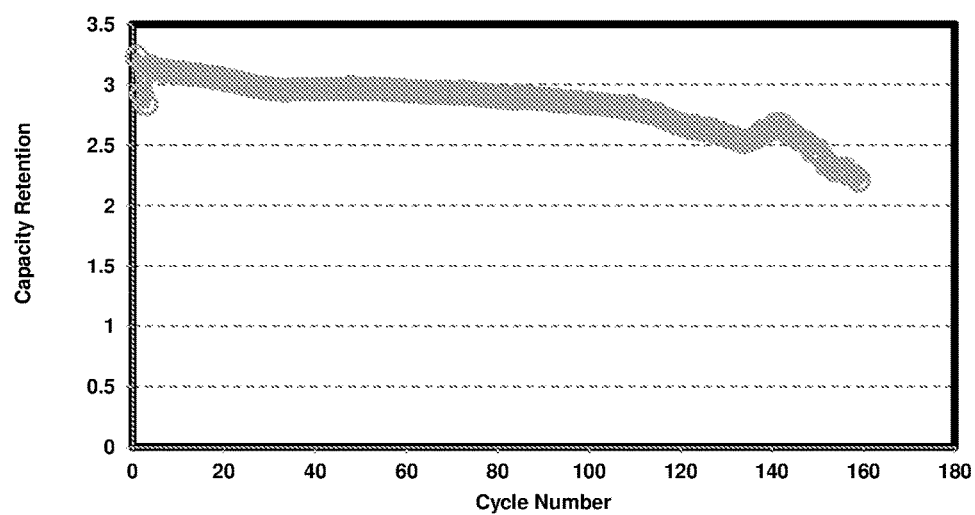
FIG. 17 illustrates the capacity retention vs number of cycles for a bi-layer half cell according to an embodiment of the invention.

FIG. 17 illustrates the capacity retention vs number of cycles for a bi-layer half cell in which the anode comprises a first layer comprising graphite, vapour grown carbon fibres and PVDF binder in a ratio of 94:3:3 cast to a thickness of 71 gsm having 1.6 g/cc of active graphite and a second layer comprising etched aluminium silicon derived silicon BET of 27.3 m2/g and a porosity of 0.64 cc/g, sodium polyacrylate binder, graphite and a conductive carbon in a ratio of 70:14:12:4 cast to a thickness of 8 gsm of active Si. The cathode is lithium.

Figure 18:
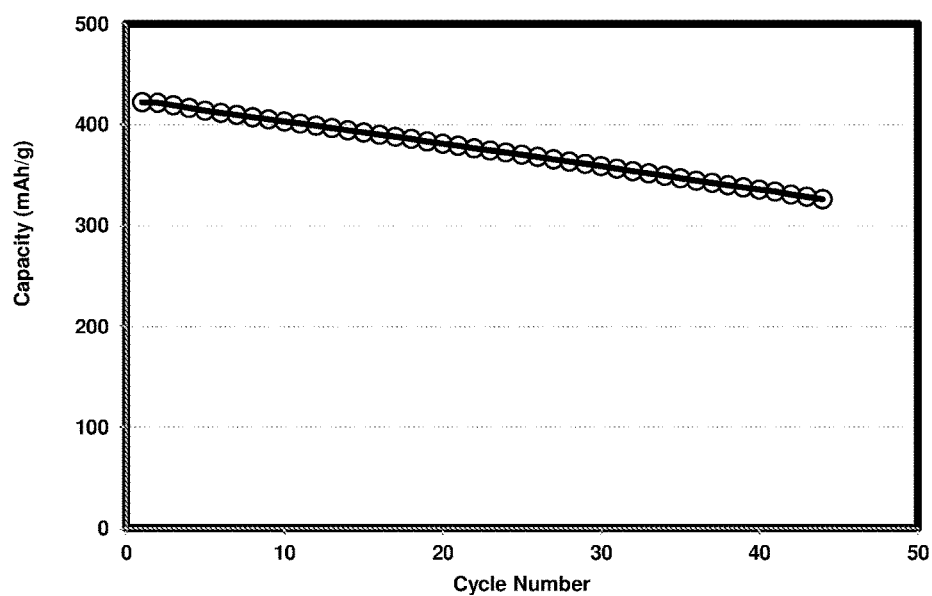
FIG. 18 illustrates the capacity vs number of cycles for a bi-layer full cell according to an embodiment of the invention.

FIG. 18 illustrates the capacity vs number of cycles for a bi-layer full cell in which the anode comprises a first layer comprising graphite, vapour grown carbon fibres and PVDF binder in a ratio of 94:3:3 cast to a thickness of 70 gsm having 1.6 g/cc of active graphite and a second layer comprising etched aluminium silicon derived silicon having a BET of 27.3 m2/g and a porosity of 0.64 cc/g, sodium polyacrylate binder, graphite and a conductive carbon in a ratio of 70:14:12:4 cast to a thickness of 8 gsm of active Si. The anode has a capacity of 1.2 mAh/cm2. A cathode having a capacity of 2.7 mAh/cm2 is used.

Figure 19:
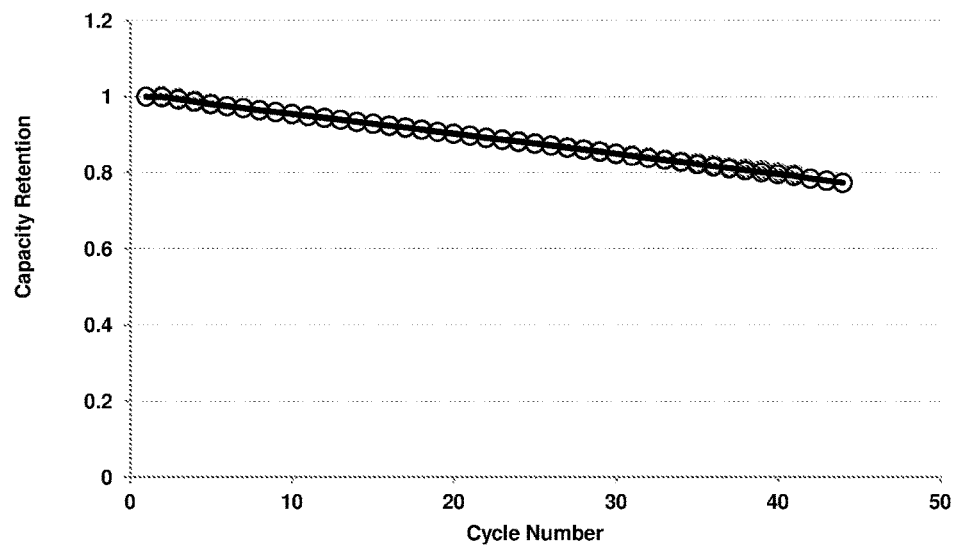
FIG. 19 illustrates the capacity retention vs number of cycles for a bi-layer full cell according to an embodiment of the invention.

FIG. 19 illustrates the capacity retention vs number of cycles for a bi-layer full cell in which the anode comprises a first layer comprising graphite, vapour grown carbon fibres and PVDF binder in a ratio of 94:3:3 cast to a thickness of 70 gsm having 1.6 g/cc of active graphite and a second layer comprising etched aluminium silicon derived silicon having a BET of 27.3 m2/g and a porosity of 0.64 cc/g, sodium polyacrylate binder, graphite and a conductive carbon in a ratio of 70:14:12:4 cast to a thickness of 8 gsm of active Si. The anode has a capacity of 1.2 mAh/cm2. A cathode having a capacity of 2.7 mAh/cm2 is used.

Although the invention has been described primarily with reference to rechargeable lithium ion batteries, it will be appreciated that the invention may be applied to other rechargeable metal ion batteries including, without limitation, sodium, potassium, calcium and magnesium ion batteries. Further, it will be understood that multilayer structures as described herein may be used in a range of electrical and/or optical devices other than metal ion batteries including, without limitation, flow cell batteries, fuel cells, solar cells, filters, sensors, electrical and thermal capacitors, micro-fluidic devices, gas or vapour sensors, thermal or dielectric insulating devices, devices for controlling or modifying the transmission, absorption or reflectance of light or other forms of electromagnetic radiation. Although the present invention has been described in terms of specific exemplary embodiments, it will be appreciated that various modifications, alterations and/or combinations of features disclosed herein will be apparent to those skilled in the art without departing from the scope of the invention as set forth in the following claims.

The invention claimed is:

1. A multilayer electrode comprising, in sequence, a conductive layer, a first composite electrode layer and a second composite electrode layer, each composite electrode layer comprising a particulate material suitable for use as an active material in a metal ion battery and a binder, wherein a major component of the active material of the first composite electrode layer (first major active component) is an active carbon and a major component of the active material of the second composite electrode layer (second major active component) is selected from the group consisting of silicon and tin, and wherein
    the binder of the first composite electrode layer is polyvinylidene fluoride (PVDF), or a polyimide (PI), or a mixture of PVDF and PI, and
    the binder of the second composite electrode layer is (i) polyacrylic acid (PAA) or a salt thereof, or (ii) carboxymethylcellulose (CMC) or a salt thereof, or (iii) styrene butadiene rubber (SBR), or (iv) a binary or tertiary mixture of two or more of (i), (ii), and (iii).

2. The multilayer electrode according to claim 1, which comprises an interface between the first composite layer and the second composite layer.

3. The multilayer electrode according to claim 1, wherein each composite electrode layer comprises one or more sub-layers, optionally wherein a concentration of the major active component of one sub-layer differs from a concentration of a major active component in an adjacent sub-layer within a composite layer of the multilayer electrode.

4. The multilayer electrode according to claim 3, wherein a concentration of the first major active component decreases between a current collector and an interface with the second composite electrode layer, and/or wherein a concentration of the second major active component decreases in a direction between an interface with the first composite electrode layer and an upper surface of the second composite electrode layer.

5. The multilayer electrode according to claim 3, wherein a porosity of the first composite electrode layer is different to a porosity of the second composite electrode layer, optionally wherein the porosity of the first composite electrode layer is less than the porosity of the second composite electrode layer.

6. The multilayer electrode according to claim 3, wherein a porosity of the first composite electrode layer is greater than 5 vol % and less than 30 vol %, optionally 20 to 25 vol %; and/or wherein a porosity of the first composite electrode layer is less than 30 vol % and less than 80 vol %, optionally 30 to 70 vol %.

7. The multilayer electrode according to claim 1, wherein doped or undoped silicon is the major active component of the second composite electrode layer.

8. The multilayer electrode according to claim 1, wherein a concentration of the major active component in the first composite anode layer is higher than a concentration of the major active component in the second composite anode layer.

9. The multilayer electrode according to claim 1, wherein the second composite electrode layer contains no more than 20 grams per square meter of the major active component of that layer, and/or wherein the first composite electrode layer contains at least 30 grams per square meter of the major active component of that layer.

10. The multilayer electrode according to claim 1, wherein the active carbon is selected from one or more of hard carbon, carbon nano-tubes and graphite.

11. The multilayer electrode according to claim 1, wherein active carbon is the only active component of the first composite electrode layer, and/or wherein doped or undoped silicon is the only active component of the second composite electrode layer.

12. The multilayer electrode according to claim 1, wherein the second composite electrode layer further comprises an active carbon material.

13. The multilayer electrode according to claim 1, wherein one or more of the composite electrode layers further comprises a conductive particulate additive.

14. A metal ion battery comprising:
an anode according to claim 1;
a cathode providing a source of metal ions; and
an electrolyte between the anode and the cathode.

15. The multilayer electrode according to claim 10, wherein the graphite is natural or synthetic graphite selected from flakes, meso-carbon micro-beads and massive artificial graphite.

16. The multilayer electrode according to claim 1, wherein the particulate material of the second composite electrode layer comprises a silicon-containing particulate material.

17. The multilayer electrode according to claim 16, wherein the silicon-containing particulate material comprises flakes, particles, fibres, ribbons, scaffold structures or tubes.

18. The multilayer electrode according to claim 17, wherein the particles comprise native particles, pillared particles, porous particles, porous particle fragments and mixtures thereof.

* * * * *